United States Patent
Aiba et al.

(10) Patent No.: US 10,616,892 B2
(45) Date of Patent: Apr. 7, 2020

(54) USER EQUIPMENTS, BASE STATIONS AND METHODS

(71) Applicants: Sharp Kabushiki Kaisha, Sakai-ku, Sakai, Osaka (JP); FG Innovation Company Limited, New Territories, Hong Kong (CN)

(72) Inventors: Tatsushi Aiba, Vancouver, WA (US); Jia Sheng, Vancouver, WA (US); Toshizo Nogami, Chiba (JP)

(73) Assignees: Sharp Kabushiki Kaisha, Osaka (JP); FG Innovation Company Limited, Hong Kong (CN)

( * ) Notice: Subject to any disclaimer, the term of this patent is extended or adjusted under 35 U.S.C. 154(b) by 0 days.

(21) Appl. No.: 15/969,106

(22) Filed: May 2, 2018

(65) Prior Publication Data

US 2018/0324804 A1 Nov. 8, 2018

Related U.S. Application Data

(63) Continuation of application No. PCT/US2018/030431, filed on May 1, 2018.
(Continued)

(51) Int. Cl.
*H04W 72/04* (2009.01)
*H04W 56/00* (2009.01)
(Continued)

(52) U.S. Cl.
CPC ....... *H04W 72/0453* (2013.01); *H04L 5/0048* (2013.01); *H04L 5/0053* (2013.01);
(Continued)

(58) Field of Classification Search
CPC .......... H04W 72/0453; H04W 56/00;qa H04L 5/0048; H04L 5/0053; H04L 5/0092;
(Continued)

(56) References Cited

U.S. PATENT DOCUMENTS 8,031,583 B2  10/2011  Classon et al.
2015/0264683 A1*  9/2015  Kim ............... H04L 5/0007
                                                370/329
(Continued)

FOREIGN PATENT DOCUMENTS

WO  2017184341 A1  10/2017
WO  2018039379 A1  3/2018

OTHER PUBLICATIONS

Qualcomm Incorporated, "Synchronization signal bandwidth and multiplexing consideration", 3GPP TSG RAN WG1 NR AdHoc, Spokane, USA, R1-1700784, Jan. 20, 2017.
(Continued)

*Primary Examiner* — Jenee Holland
(74) *Attorney, Agent, or Firm* — Austin Rapp

(57) ABSTRACT

A UE includes receiving circuitry that receives a radio resource control (RRC) message including information indicating a subcarrier spacing of a block comprising, at least, a primary synchronization signal (PSS) and a secondary synchronization signal (SSS) and a physical broadcast channel (PBCH). The receiving circuitry also receives, based on the information, the block comprising, at least, the PSS and the SSS and the PBCH. The information is used only for a case where the UE is in a RRC connected. In a case that the information is not configured, the receiving circuitry receives, based on a default value of the subcarrier spacing, the block comprising, at least, the PSS and the SSS and the PBCH. The default value of the subcarrier spacing is given based on a frequency band.

4 Claims, 21 Drawing Sheets

Related U.S. Application Data

(60) Provisional application No. 62/501,538, filed on May 4, 2017.

(51) Int. Cl.
  *H04L 5/00* (2006.01)
  *H04L 27/26* (2006.01)

(52) U.S. Cl.
  CPC ........ *H04L 5/0092* (2013.01); *H04L 27/2602* (2013.01); *H04L 27/2613* (2013.01); *H04L 27/2666* (2013.01); *H04L 27/2692* (2013.01); *H04W 56/00* (2013.01)

(58) Field of Classification Search
  CPC ............. H04L 27/2602; H04L 27/2613; H04L 27/2666; H04L 27/2692
  See application file for complete search history.

(56) References Cited

U.S. PATENT DOCUMENTS

| | | | |
|---|---|---|---|
| 2015/0282167 A1 | 10/2015 | Lahetkangas et al. | |
| 2015/0282178 A1* | 10/2015 | Kim | H04B 7/2656 370/329 |
| 2015/0304994 A1* | 10/2015 | Kim | H04L 5/0048 370/280 |
| 2016/0135185 A1* | 5/2016 | Chandrasekhar | H04W 16/14 370/329 |
| 2017/0164350 A1* | 6/2017 | Sun | H04L 5/0007 |
| 2017/0290008 A1* | 10/2017 | Tooher | H04L 1/0007 |
| 2018/0270698 A1* | 9/2018 | Babaei | H04W 72/1284 |
| 2018/0279262 A1* | 9/2018 | Babaei | H04L 1/00 |

OTHER PUBLICATIONS

Ericsson, "Impact of mixed numerologies on EUs in idle mode", 3GPP TSG-RAN WG2 Meeting #97, Athens, Greece, R2-1700854, Feb. 17, 2017.

Potevio, "Discussion on the numerology during initial access procedure", 3GPP TSG RAN WG1 Meeting #87, Reno, USA, R1-1612650, Nov. 18, 2016.

International Search Report and Written Opinion issued for PCT Application No. PCT/US2018/030431 dated Jul. 25, 2018.

3GPP TS 36.211 V14.1.0, Evolved Universal Terrestrial Radio Access (E-UTRA); Physical channels and modulation (Release 14) Dec. 2016.

3GPP TS 36.213 V14.1.0, Evolved Universal Terrestrial Radio Access (E-UTRA); Physical layer procedures (Release 14) Dec. 2016.

3GPP TS 36321, V14.1.0, Evolved Universal Terrestrial Radio Access (E-UTRA); Medium Access Control (MAC); Protocol specification (Release 14) Dec. 2016.

3GPP TS 36331, V14.1.0, Evolved Universal Terrestrial Radio Access (E-UTRA); Radio Resource Control (RRC); Protocol specification (Release 14) Dec. 2016.

LG Electronics, "Discussion on wideband operation", 3GPP TSG RAN WG1 Meeting #88, Athens, Greece, R1-1702503, Feb. 17, 2017.

* cited by examiner

USER EQUIPMENTS, BASE STATIONS AND METHODS

RELATED APPLICATIONS

This application is related to and claims priority from U.S. Provisional Patent Application No. 62/501,538, entitled "USER EQUIPMENTS, BASE STATIONS AND METHODS," filed on May 4, 2017, which is hereby incorporated by reference herein, in its entirety.

TECHNICAL FIELD

The present disclosure relates generally to communication systems. More specifically, the present disclosure relates to new signaling, procedures, user equipment (UE) and base stations for user equipments, base stations and methods.

BACKGROUND

Wireless communication devices have become smaller and more powerful to meet consumer needs and to improve portability and convenience. Consumers have become dependent upon wireless communication devices and have come to expect reliable service, expanded areas of coverage and increased functionality. A wireless communication system may provide communication for one or more wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
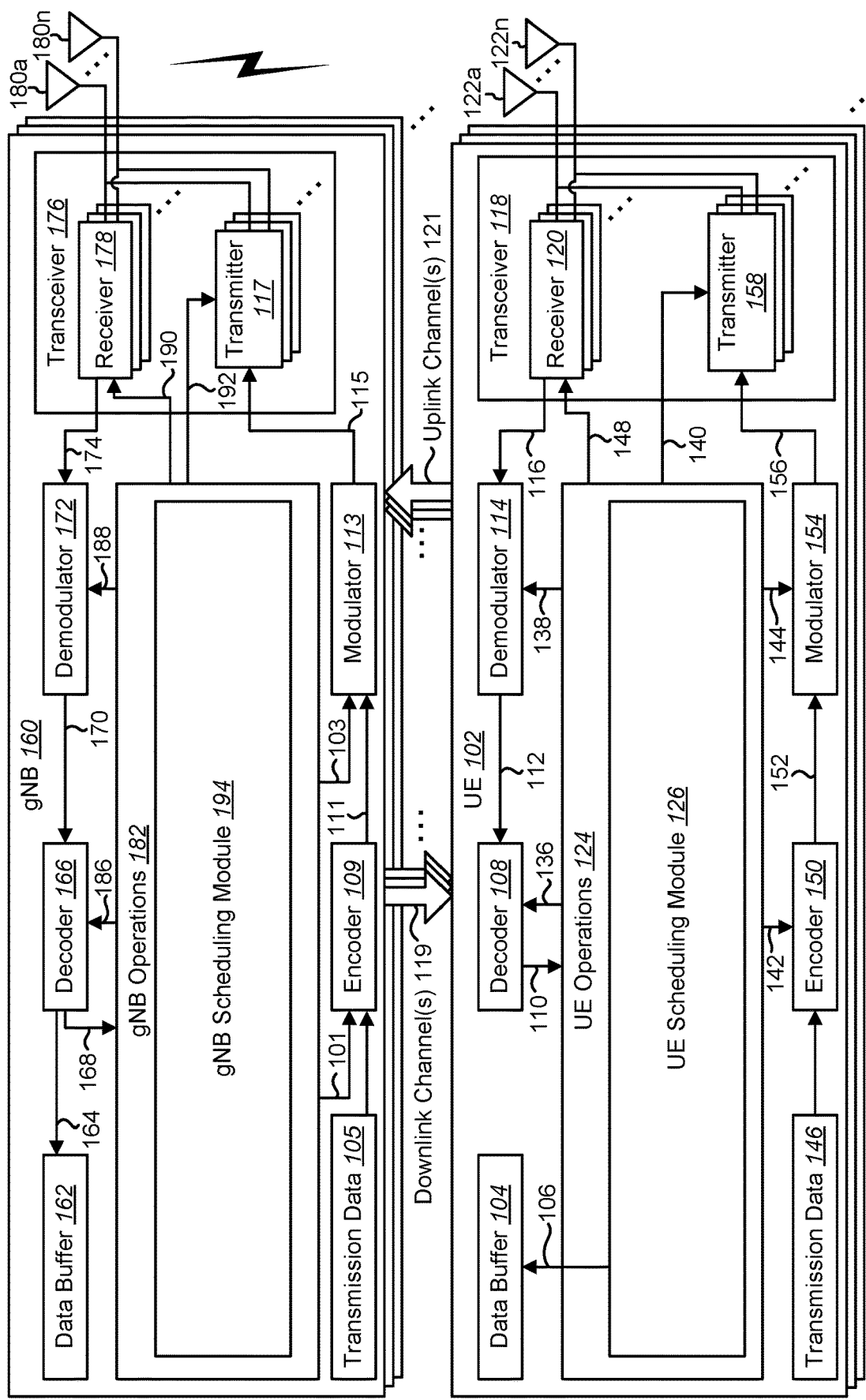
FIG. 1 is a block diagram illustrating one implementation of one or more base station apparatuses (gNBs) and one or more user equipments (UEs) in which systems and methods for uplink transmission may be implemented.

A user equipment (UE) that communicates with a base station apparatus is described. The UE includes receiving circuitry configured to receive a radio resource control (RRC) message including information indicating a subcarrier spacing of a block comprising, at least, a primary synchronization signal (PSS) and a secondary synchronization signal (SSS) and a physical broadcast channel (PBCH). The receiving circuitry is also configured to receive, based on the information, the block comprising, at least, the PSS and the SSS and the PBCH. The information is used only for a case where the UE is in a RRC connected. In a case that the information is not configured, the receiving circuitry is configured to receive, based on a default value of the subcarrier spacing, the block comprising, at least, the PSS and the SSS and the PBCH. The default value of the subcarrier spacing is given based on a frequency band.

For below 6 GHz, the default value of the subcarrier spacing is 15 or 30 kHz. For above 6 GHz, the default value of the subcarrier spacing is 120 or 240 kHz.

A base station apparatus that communicates with a UE is also described. The base station includes transmitting circuitry configured to transmit an RRC message including information indicating a subcarrier spacing of a block comprising, at least, a PSS and an SSS and a PBCH. The transmitting circuitry configured to transmit, based on the information, the block comprising, at least, the PSS and the SSS and the PBCH. The information is used only for a case where the UE is in a RRC connected. In a case that the information is not configured, the transmitting circuitry is configured to transmit, based on a default value of the subcarrier spacing, the block comprising, at least, the PSS and the SSS and the PBCH. The default value of the subcarrier spacing is given based on a frequency band.

A communication method of a UE that communicates with a base station apparatus is also described. The method includes receiving an RRC message including information indicating a subcarrier spacing of a block comprising, at least, a PSS and an SSS and a PBCH. The method also includes receiving, based on the information, the block comprising, at least, the PSS and the SSS and the PBCH. The information is used only for a case where the UE is in a RRC connected. In a case that the information is not configured, receiving, based on a default value of the subcarrier spacing, the block comprising, at least, the PSS and the SSS and the PBCH. The default value of the subcarrier spacing is given based on a frequency band.

A communication method of a base station apparatus that communicates with a UE is also described. The method includes transmitting a RRC message including information indicating a subcarrier spacing of a block comprising, at least, a PSS and a SSS and a PBCH. The method also includes transmitting, based on the information, the block comprising, at least, the PSS and the SSS and the PBCH. The information is used only for a case where the UE is in a RRC connected. In a case that the information is not configured, transmitting, based on a default value of the subcarrier spacing, the block comprising, at least, the PSS and the SSS and the PBCH. The default value of the subcarrier spacing is given based on a frequency band.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The 5th generation communication systems, dubbed NR (New Radio technologies) by 3GPP, envision the use of time/frequency/space resources to allow for services, such as eMBB (enhanced Mobile Broad-Band) transmission, URLLC (Ultra-Reliable and Low Latency Communication) transmission and eMTC (massive Machine Type Communication) transmission. Also, in NR, single-beam and/or multi-beam operations are considered for downlink and/or uplink transmissions.

In order for the services to use the time/frequency/space resource efficiently, it would be useful to be able to efficiently control downlink and/or uplink transmissions. Therefore, a procedure for efficient control of downlink and/or uplink transmissions should be designed. However, the detailed design of a procedure for downlink and/or uplink transmissions has not been studied yet.

FIG. 1 is a block diagram illustrating one implementation of one or more gNBs 160 and one or more UEs 102 in which systems and methods for downlink and/or uplink transmissions may be implemented. The one or more UEs 102 communicate with one or more gNBs 160 using one or more physical antennas 122a-n. For example, a UE 102 transmits electromagnetic signals to the gNB 160 and receives electromagnetic signals from the gNB 160 using the one or more physical antennas 122a-n. The gNB 160 communicates with the UE 102 using one or more physical antennas 180a-n. In some implementations, the term "base station," "eNB," and/or "gNB" may refer to and/or may be replaced by the term "Transmission Reception Point (TRP)." For example, the gNB 160 described in connection with FIG. 1 may be a TRP in some implementations.

The UE 102 and the gNB 160 may use one or more channels and/or one or more signals 119, 121 to communicate with each other. For example, the UE 102 may transmit information or data to the gNB 160 using one or more uplink channels 121. Examples of uplink channels 121 include a physical shared channel (e.g., PUSCH (Physical Uplink Shared Channel)) and/or a physical control channel (e.g., PUCCH (Physical Uplink Control Channel)), etc. The one or more gNBs 160 may also transmit information or data to the one or more UEs 102 using one or more downlink channels 119, for instance. Examples of downlink channels 119 physical shared channel (e.g., PDSCH (Physical Downlink Shared Channel) and/or a physical control channel (PDCCH (Physical Downlink Control Channel)), etc. Other kinds of channels and/or signals may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122*a-n*. For example, the receiver 120 may receive and downconvert signals to produce one or more received signals 116. The one or more received signals 116 may be provided to a demodulator 114. The one or more transmitters 158 may transmit signals to the gNB 160 using one or more physical antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE scheduling module 126.

The UE scheduling module 126 may perform uplink transmissions. The uplink transmissions include data transmission) and/or uplink reference signal transmission.

In a radio communication system, physical channels (uplink physical channels and/or downlink physical channels) may be defined. The physical channels (uplink physical channels and/or downlink physical channels) may be used for transmitting information that is delivered from a higher layer.

For example, in uplink, a PRACH (Physical Random Access Channel) may be defined. For instance, the PRACH may be used for a random access preamble (e.g., a message 1 (Msg.1)). In some approaches, the PRACH may be used for an initial access connection establishment procedure, a handover procedure, a connection re-establishment, a timing adjustment (e.g., a synchronization for an uplink transmission) and/or for requesting an uplink shared channel (UL-SCH) resource (e.g., the uplink PSCH (e.g., PUSCH) resource).

In another example, a PCCH (Physical Control Channel) may be defined. The PCCH may be used to transmit control information. In uplink, PCCH (e.g., Physical Uplink Control Channel (PUCCH)) is used for transmitting Uplink Control Information (UCI). The UCI may include Hybrid Automatic Repeat Request (HARQ-ACK), Channel State information (CSI) and/or Scheduling Request (SR). The HARQ-ACK is used for indicating a positive acknowledgement (ACK) or a negative acknowledgment (NACK) for downlink data (e.g., Transport block(s), Medium Access Control Protocol Data Unit (MAC PDU) and/or Downlink Shared Channel (DL-SCH)). The CSI is used for indicating state of downlink channel. Also, the SR is used for requesting resources of uplink data (e.g., Transport block(s), MAC PDU and/or Uplink Shared Channel (UL-SCH)).

In downlink, the PCCH (e.g., Physical Downlink Control Channel (PDCCH)) may be used for transmitting Downlink Control Information (DCI). Here, more than one DCI format may be defined for DCI transmission on the PCCH. Namely, fields may be defined in the DCI format, and the fields are mapped to the information bits (e.g., DCI bits).

For example, a DCI format 1A that is used for scheduling of one physical shared channel (PSCH) (e.g., PDSCH, transmission of one downlink transport block) in a cell is defined as the DCI format for the downlink. For example, information associated with PSCH (a PDSCH resource) allocation, information associated with modulation and coding scheme (MCS) for PSCH, and DCI such as Transmission Power Control (TPC) command for PCCH are included the DCI format 1A. Also, the DCI format 1A may include information used for requesting HARQ-ACK transmission, CSI transmission, and/or SRS transmission. Also, the DCI format 1A may include information associated with a beam index and/or an antenna port. The beam index may indicate a beam used for downlink transmissions and uplink transmissions. The antenna port may include DL antenna port and/or UL antenna port.

Also, for example, a DCI format 0 that is used for scheduling of one PSCH (e.g., PUSCH, transmission of one uplink transport block) in a cell is defined as the DCI format for the uplink. For example, information associated with PSCH (a PUSCH resource) allocation, information associated with modulation and coding scheme (MCS) for PSCH, and DCI such as Transmission Power Control (TPC) command for PSCH are included the DCI format 0. Also, the DCI format 0 may include information used for requesting HARQ-ACK transmission, CSI transmission, and/or SRS transmission. Also, the DCI format 0 may include information associated with a beam index and/or an antenna port. The beam index may indicate a beam used for downlink transmissions and uplink transmissions. The antenna port may include DL antenna port and/or UL antenna port.

Namely, for example, PSCH may be defined. For example, in a case that the downlink PSCH resource (e.g., the PDSCH resource) is scheduled by using the DCI format (e.g., the DCI format 1A), the UE 102 may receive the downlink data, on the scheduled downlink PSCH resource.

Also, in a case that the uplink PSCH resource (e.g., the PUSCH resource) is scheduled by using the DCI format (e.g., the DCI format 0), the UE 102 transmits the uplink data, on the scheduled uplink PSCH resource. Namely, the downlink PSCH is used to transmit the downlink data. And, the uplink PSCH is used to transmit the uplink data.

Furthermore, the downlink PSCH and the uplink PSCH are used to transmit information of higher layer (e.g., Radio Resource Control (RRC)) layer and/or MAC layer). For example, the downlink PSCH and the uplink PSCH are used to transmit RRC message (RRC signal) and/or MAC Control Element (MAC CE). Here, the RRC message that is transmitted from the gNB 160 in downlink may be common to multiple UEs 102 within a cell (referred as a common RRC message). Also, the RRC message that is transmitted from the gNB 160 may be dedicated to a certain UE 102 (referred as a dedicated RRC message). The RRC message and/or the MAC CE are also referred to as a higher layer signal.

In some approaches, the downlink PSCH (e.g., the PDSCH) may be used for transmitting (e.g., notifying, specifying, identifying, etc.) a random access response. For example, the downlink PSCH (e.g., the PDSCH) may be scheduled by using the downlink PCH (e.g., the PDCCH) with RA-RNTI (Random Access RNTI (Radio Network Temporary Identifier)). For instance, the random access response grant may be used for scheduling of the uplink PSCH (e.g., the PUSCH, Message 3 in a random access procedure). The random access response grant may be delivered from the higher layer (e.g., the MAC layer) to the physical layer.

In some approaches, a PBCH (Physical Broadcast Channel, (e.g., Primary PBCH)) may be defined. For example, the PBCH may be used for broadcasting the MIB (Master Information Block). For instance, the MIB may be used by multiple UEs 102 and may include system information transmitted on the BCH (Broadcast Channel). Also, the MIB may include information (e.g., an information block) for configuring a Secondary PBCH. Furthermore, the MIB may include information (e.g., an information block) for configuring the downlink PSCH (e.g., PDSCH). For example, the PBCH (e.g., MIB) may be used for carrying, at least, information indicating a SFN (System Frame Number).

The system information may be divided into the MIB and a number of SIB(s) (System Information Block(s)). The MIB may include a limited number of most essential and/or most frequently transmitted information (e.g., parameter(s)) that are needed to acquire other information from the cell. Namely, the PBCH (e.g., MIB) may include minimum system information. Also, the SIB(s) may be carried in a System Information message. For example, the SIB(s) may be transmitted on the Secondary PBCH and/or the downlink PSCH (e.g., the PDSCH). The SIB(s) may include remaining minimum system information. For example, the SIB(s) (e.g., System Information Block Type 2) may contain radio resource configuration information that is common for multiple UEs 102.

In some approaches, the SIB(s) may contain information for a random access channel configuration (e.g., a random access configuration for a preamble format) that is used for a random access procedure (e.g., a random access preamble transmission (Msg.1 transmission)). For example, the information for the random access configuration may include the preamble format, the SFN, a subframe number (e.g., a subframe number, a slot number and/or a symbol number). Also, a part of the information for the random access configuration may be included in the MIB (e.g., PBCH).

In some approaches, in downlink, a SS (Synchronization Signal) may be defined. The SS may be used for synchronizing downlink time-frequency (a time domain and/or a frequency domain). The SS may include a PSS (Primary Synchronization Signal). Additionally or alternatively, the SS may include a SSS (Secondary Synchronization Signal). Additionally or alternatively, the SS may include a TSS (Tertiary Synchronization Signal). For example, the PSS, the SSS, the TSS and/or the PBCH may be used for identifying a physical layer cell identity. Additionally or alternatively, the PSS, the SSS, the TSS and/or the PBCH may be used for identifying an identity for one or more beams, one or more TRPs and/or one or more antenna ports. Additionally or alternatively, the PSS, the SSS, TSS and/or the PBCH may be used for identifying an OFDM symbol index, a slot index in a radio frame and/or a radio frame number.

For example, the number of sequences of PSS may be one and/or three. And, three PSS sequences may be used for providing identification of a physical cell identity (or a physical cell identity group). Also, the sequences of SSS may be used for providing identification of a physical cell identity group (or a physical cell identity). Also, the TSS (e.g., the sequences of TSS) may be used for providing (e.g., indicating) an index (e.g., a time index) of a Synchronization Signal block(s) (i.e., SS block(s)). Here, the index of a SS block(s) (e.g., the time index of the SS block(s)) may be indicated by using the PSS, the SSS, the TSS, the PBCH (e.g., the MIB), and/or the PDSCH (e.g., the SIB). Here, the TSS may be a Tertiary Synchronization Channel (i.e., TSCH).

For example, the SS block(s) may be used for transmission of, at least, the PSS, the SSS, the TSS, and/or the PBCH. Namely, the PSS, the SSS, the TSS, and/or the PBCH may be transmitted within the SS block(s). Also, the PSS, the SSS, the TSS, and/or the PBCH may be present in the SS block(s) (e.g., in every SS block(s)). For example, a time division multiplexing of the PSS, the SSS, the TSS, and/or the PBCH may be applied in the SS block(s). Also, a frequency division multiplexing of the PSS, the SSS, the TSS, and/or the PBCH may be applied in the SS block(s). For example, one symbol (e.g., OFDM symbol) corresponding to the PSS, one symbol corresponding to the SSS, two symbols corresponding to the PBCH, and/or one symbol corresponding the TSS may be present in per SS block. Namely, there may be one symbol for the PSS, one symbol for the SSS, two symbols for the PBCH, and/or the one symbol for the TSS within one SS block (i.e., per SS block).

Here, one or more SS blocks may compose a SS burst. Also, one or more SS bursts may compose a SS burst set. Also, one or more SS blocks may compose a SS burst set. Namely, a SS burst may consist of one or more SS blocks. Also, a SS burst set may consist of one or more SS bursts. Also, a SS burst set may consist of one or more SS blocks. For example, the maximum number of the SS blocks within the SS burst set may be defined, in advance, by specification and known information between the gNB 160 and the UE 102. For example, for a frequency range up to 3 GHz, the maxim number of the SS blocks within the SS burst set may be 1, 2, and/or 4. Also, for example, for a frequency range from 3 GHz to 6 GHz, the maximum number of the SS blocks within the SS burst set may be 4 and/or 8. Also, for a frequency range from 6 GHz to 52.6 GHz, the maximum number of the SS blocks within the SS burst set may be 64. Namely, the maximum number of the SS blocks within the SS burst set may be depend on a frequency range, and defined.

Here, the SS burst(s) and/or the SS burst set(s) may be periodic. For example, a default periodicity (i.e., a predetermined periodicity) of the SS burst(s) may be defined, in advance, by the specification and known information between the gNB 160 and the UE 102. Also, a default periodicity of the SS burst set(s) may be defined, in advance, by the specification and known information between the gNB 160 and the UE 102. Also, a default periodicity of the SS block(s) may be defined, in advance, by the specification and known information between the gNB 160 and the UE 102. Also, a default periodicity of the PSS(s) (and/or the SSS(s), and/or the PBCH(s)) may be defined, in advance, by the specification and known information between the gNB 160 and the UE 102. Also, a default periodicity of the TSS(s) may be defined, in advance, by the specification and known information between the gNB 160 and the UE102. Here, at least, the default periodicity of the SS burst(s), the default periodicity of the SS burst set(s), the default periodicity of the SS block(s), the default periodicity of the PSS(s) (and/or the SSS(s), and/or the PBCH(s)), and/or the default periodicity of the TSS(s) described herein may be assumed to be included in a default periodicity of a downlink SS (i.e., a DL SS) in some implementations for the sake of simple description. For example, the default periodicity of the DL SS may be 5 ms, 10 ms, and/or 20 ms. Also, the default periodicity of the DL SS may be depend on a frequency range, and defined. Here, the default periodicity of the DL SS may be a reference periodicity of the DL SS.

Also, the gNB 160 may transmit, (e.g., by using the PBCH (e.g., the MIB), the PDSCH (e.g., the SIB), and/or the dedicated RRC message), first information used for configuring a periodicity of the SS burst(s). Also, the gNB 160 may transmit, (e.g., by using the PBCH (e.g., the MIB), the PDSCH (e.g., the SIB), and/or the dedicated RRC message), second information used for configuring a periodicity of the SS burst set(s). Also, the gNB 160 may transmit, (e.g., by using the PBCH (e.g., the MIB), the PDSCH (e.g., the SIB), and/or the dedicated RRC message), third information used for indicating a position(s) (e.g., an index (e.g., a time index), an index of the SS block, etc.) of actually transmitted SS block(s). Namely, the gNB 160 may transmit an indication (i.e. the third information) of which of the nominal SS block(s) in the SS burst set(s) that are actually transmitted. Namely, information (e.g., the PSS(s), the SSS(s), the PBCH(s), and/or the TSS(s)) may not be present (e.g., transmitted by the gNB 160) in the all SS block(s) defined within the SS block burst set(s). Namely, there may be the nominal SS block(s) (i.e., unused SS block(s) for the PSS(s), the SSS(s), the PBCH(s), and/or the TSS(s)) within the SS burst set(s). The gNB 160 may transmit the indication (i.e., the third information) of actually used SS block(s) (e.g., SS block(s) among the SS block(s) defined within the SS burst set(s)). Here, at least, the first information, the second information, and/or the third information described herein may be assumed to be included in a SS periodicity configuration in some implementations for the sake of simple description. Here, the SS periodicity configuration may include other information, and the other information is not precluded as the SS periodicity configuration.

Also, a default subcarrier spacing (i.e., a predetermined subcarrier spacing, a default numerology, and/or a predetermined numerology) of the SS burst(s) may be defined, in advance, by the specification and known information between the gNB 160 and the UE 102. Also, a default subcarrier spacing of the SS burst set(s) may be defined, in advance, by the specification and known information between the gNB 160 and the UE 102. Also, a default subcarrier spacing of the SS block(s) may be defined, in advance, by the specification and known information between the gNB 160 and the UE 102. For example, a default subcarrier spacing of the PSS(s) (and/or the SSS(s), and/or the PBCH(s)) may be defined, in advance, by the specification and known information between the gNB 160 and the UE 102. Also, a default subcarrier spacing of the TSS(s) may be defined, in advance, by the specification and known information between the gNB 160 and the UE 102. Here, at least, the default subcarrier spacing of the SS burst(s), the default subcarrier spacing of the SS burst set(s), the default subcarrier spacing of the SS block(s), the default subcarrier spacing of the PSS(s) (and/or the SSS(s), and/or the PBCH(s)), and/or the default subcarrier spacing of the TSS(s) described herein may be assumed to be included in a default subcarrier spacing of a downlink SS (i.e., a DL SS) in some implementations for the sake of simple description. For example, for a frequency range up to 6 GHz (i.e., below 6 GHz), the default subcarrier spacing of the DL SS may be 15 kHz and/or 30 kHz. Also, for example, for a frequency range from 6 GHz (i.e., above 6 GHz), the default subcarrier spacing of the DL SS may be 120 kHz and/or 240 kHz. Namely, the default subcarrier spacing of the DL SS may be depend on a frequency range, and defined. Here, the default subcarrier spacing of the DL SS may be a reference subcarrier spacing of the DL SS.

Also, the gNB 160 may transmit, (e.g., by using the PBCH (e.g., the MIB), the PDSCH (e.g., the SIB), and/or the dedicated RRC message), fourth information used for configuring a subcarrier spacing of the SS burst(s). Also, the gNB 160 may transmit, (e.g., by using the PBCH (e.g., the MIB), the PDSCH (e.g., the SIB), and/or the dedicated RRC message), fifth information used for configuring a subcarrier spacing of the SS burst set(s). Also, the gNB 160 may transmit, (e.g., by using the PBCH (e.g., the MIB), the PDSCH (e.g., the SIB), and/or the dedicated RRC message), sixth information used for configuring a subcarrier spacing of SS block(s). Here, at least, the fourth information, the fifth information, and/or the sixth information described herein may be assumed to be included in a SS subcarrier spacing configuration in some implementations for the sake of simple description. Here, the SS subcarrier spacing configuration may include other information, and the other information is not precluded as the SS subcarrier spacing configuration.

For example, for an initial cell selection (i.e., an idle mode case), the UE 102 (e.g., an idle mode UE 102) may assume the default periodicity of the DL SS and/or the default subcarrier spacing of the DL SS. Also, for a RRC connected case (e.g., RRC connected mode case), the UE 102 (e.g., a RRC connected mode UE 102) may assume the configured periodicity based on the SS periodicity configuration. Also, for a RRC connected mode case, the UE 102 (e.g., a RRC connected mode UE 102) may assume the configured subcarrier spacing based on the SS subcarrier spacing configuration. Also, the UE 102 may assume the default periodicity in a case that the SS periodicity configuration is not configured (i.e., no value of the SS periodicity configuration is configured). Also, the UE 102 may assume the default subcarrier spacing in a case that the SS subcarrier spacing configuration is not configured (i.e., no value of the SS subcarrier spacing configuration is configured).

In the radio communication for uplink, UL RS(s) may be used as uplink physical signal(s). The uplink physical signal may not be used to transmit information that is provided from the higher layer, but is used by a physical layer. For example, the UL RS(s) may include the demodulation reference signal(s), the UE-specific reference signal(s), the sounding reference signal(s) (the SRS(s)) and/or the beam-specific reference signal(s). The demodulation reference signal(s) may include the demodulation reference signal(s) associated with transmission of the uplink physical channel (e.g., the PUSCH and/or the PUCCH).

Also, the UE-specific reference signal(s) may include reference signal(s) associated with transmission of uplink physical channel (e.g., the PUSCH and/or the PUCCH). For example, the demodulation reference signal(s) and/or the UE-specific reference signal(s) may be a valid reference for demodulation of uplink physical channel only if the uplink physical channel transmission is associated with the corresponding antenna port. The gNB 160 may use the demodulation reference signal(s) and/or the UE-specific reference signal(s) to perform (re)configuration of the uplink physical channels. The sounding reference signal may be used to measure an uplink channel state.

Also, in the radio communication for downlink, DL RS(s) may be used as downlink physical signal(s). The downlink physical signal may not be used to transmit information that is provided from the higher layer, but is used by a physical layer. For example, the DL RS(s) may include the cell-specific reference signal(s), the UE-specific reference signal(s), the demodulation reference signal(s), and/or the channel state information reference signal(s) (the CSI-RS(s)). The UE-specific reference signal may include the UE-specific reference signal(s) associated with transmission of the downlink physical channel (e.g., the PDSCH and/or the PDCCH). Also, the demodulation reference signal(s) may include the demodulation reference signal(s) associated with transmission of the downlink physical channel (e.g., the PDSCH and/or the PDCCH). Also, the CSI-RS may include Non-zero power Channel State Information-Reference signal(s) (NZP CSI-RS), and/or Zero power Channel State Information-Reference signal (ZP CSI-RS).

Here, the downlink physical channel(s) and/or the downlink physical signal(s) described herein may be assumed to be included in a downlink signal (i.e., a DL signal(s)) in some implementations for the sake of simple descriptions. Also, the uplink physical channel(s) and/or the uplink physical signal(s) described herein may be assumed to be included in an uplink signal (i.e. an UL signal(s)) in some implementations for the sake of simple descriptions.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNB s 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more physical antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more physical antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB scheduling module 194. The gNB scheduling module 194 may perform scheduling of uplink transmissions as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
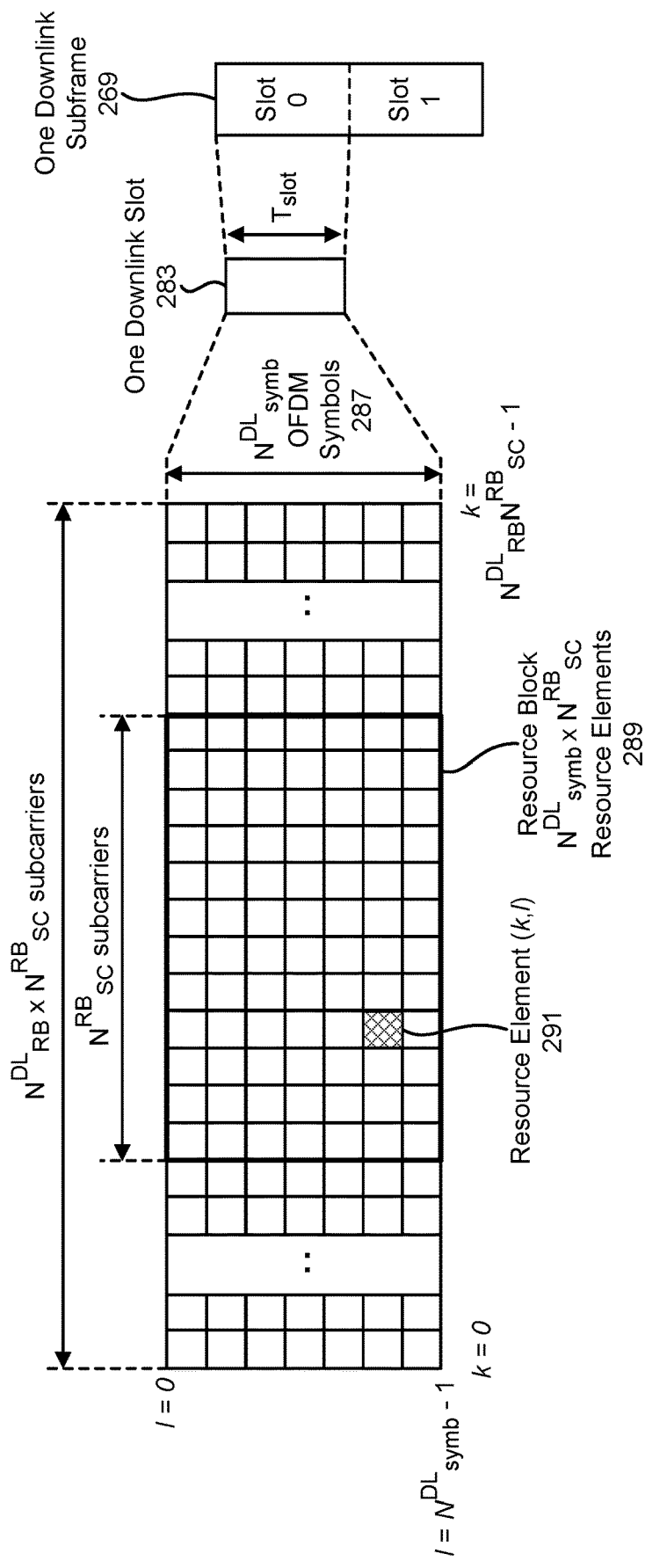
FIG. 2 is a diagram illustrating one example of a resource grid for the downlink.

FIG. 2 is a diagram illustrating one example of a resource grid for the downlink. The resource grid illustrated in FIG. 2 may be utilized in some implementations of the systems and methods disclosed herein. More detail regarding the resource grid is given in connection with FIG. 1.

In FIG. 2, one downlink subframe 269 may include two downlink slots 283. $N^{DL}_{RB}$ downlink bandwidth configuration of the serving cell, expressed in multiples of $N^{RB}_{sc}$, where $N^{RB}_{sc}$ is a resource block 289 size in the frequency domain expressed as a number of subcarriers, and $N^{DL}_{symb}$ is the number of OFDM symbols 287 in a downlink slot 283. A resource block 289 may include a number of resource elements (RE) 291.

For a PCell, $N^{DL}_{RB}$ is broadcast as a part of system information. For a SCell (including a licensed assisted access (LAA) SCell), $N^{DL}_{RB}$ is configured by a RRC message dedicated to a UE 102. For PDSCH mapping, the available RE 291 may be the RE 291 whose index l fulfils $l \geq l_{data,start}$ and/or $l_{data,end} \geq l$ in a subframe.

In the downlink, the OFDM access scheme with cyclic prefix (CP) may be employed, which may be also referred to as CP-OFDM. In the downlink, PDCCH, EPDCCH (Enhanced Physical Downlink Control Channel), PDSCH and the like may be transmitted. A downlink radio frame may include multiple pairs of downlink resource blocks (RBs) which is also referred to as physical resource blocks (PRBs). The downlink resource block (RB) pair is a unit for assigning downlink radio resources, defined by a predetermined bandwidth (RB bandwidth) and a time slot. The downlink RB pair may include two downlink RBs that are continuous in the time domain.

The downlink RB may include twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k, l) in a slot, where k and l are indices in the frequency and time domains, respectively. While downlink subframes in one component carrier (CC) are described herein, downlink subframes are defined for each CC and downlink subframes are substantially in synchronization with each other among CCs.

Figure 3:
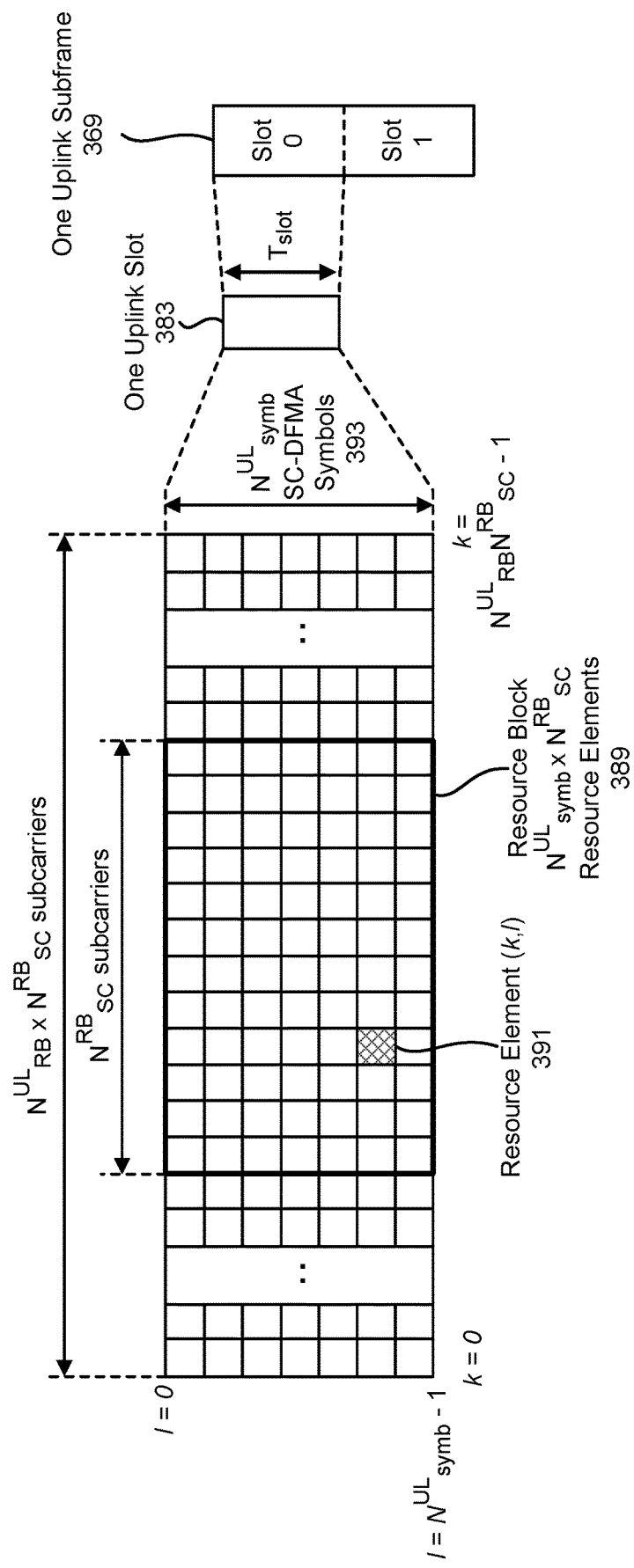
FIG. 3 is a diagram illustrating one example of a resource grid for the uplink.

FIG. 3 is a diagram illustrating one example of a resource grid for the uplink. The resource grid illustrated in FIG. 3 may be utilized in some implementations of the systems and methods disclosed herein. More detail regarding the resource grid is given in connection with FIG. 1.

In FIG. 3, one uplink subframe 369 may include two uplink slots 383. $N^{UL}_{RB}$ is uplink bandwidth configuration of the serving cell, expressed in multiples of $N^{RB}_{sc}$, where $N^{RB}_{sc}$ is a resource block 389 size in the frequency domain expressed as a number of subcarriers, and $N^{UL}_{symb}$ is the number of SC-FDMA symbols 393 in an uplink slot 383. A resource block 389 may include a number of resource elements (RE) 391.

For a PCell, $N^{UL}_{RB}$ is broadcast as a part of system information. For a SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PDSCH, Physical Random Access Channel (PRACH) and the like may be transmitted. An uplink radio frame may include multiple pairs of uplink resource blocks. The uplink RB pair is a unit for assigning uplink radio resources, defined by a predetermined bandwidth (RB bandwidth) and a time slot. The uplink RB pair may include two uplink RBs that are continuous in the time domain.

The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a resource element (RE) and is uniquely identified by the index pair (k,l) in a slot, where k and l are indices in the frequency and time domains respectively. While uplink subframes in one component carrier (CC) are described herein, uplink subframes are defined for each CC.

Figure 4:
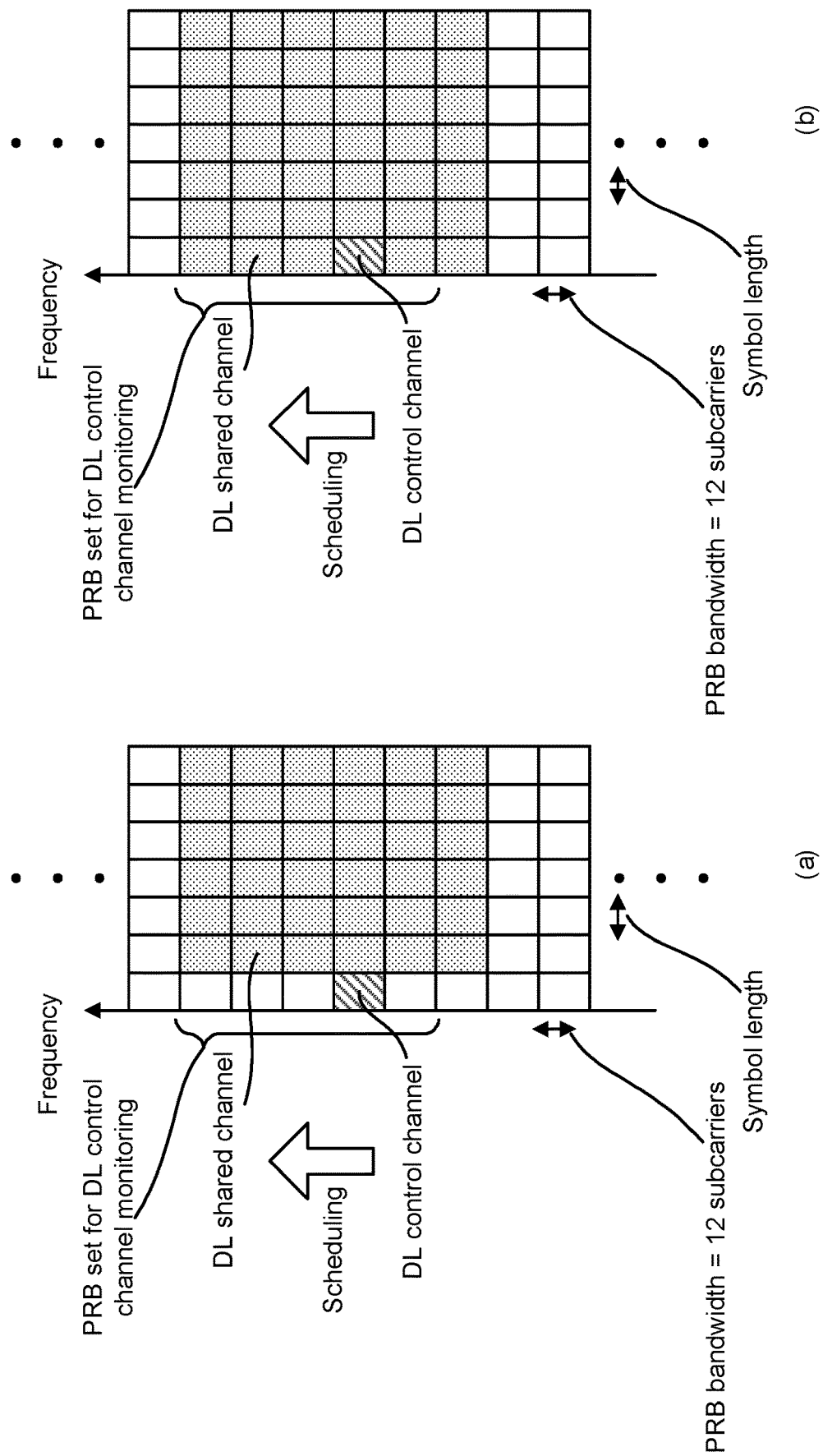
FIG. 4 shows examples of downlink (DL) control channel monitoring regions.

FIG. 4 shows examples of DL control channel monitoring regions (e.g., in an occasion(s) of DL control channel (e.g., PCCH)). One or more sets of PRB(s) may be configured for DL control channel monitoring. In other words, a control resource set is, in the frequency domain, a set of PRBs within which the UE 102 attempts to blindly decode downlink control information (e.g., monitor downlink control information (DCI)), where the PRBs may or may not be frequency contiguous, a UE 102 may have one or more control resource sets and one DCI message may be located within one control resource set. In the frequency-domain, a PRB is the resource unit size (which may or may not include Demodulation Reference Signal (DM-RS)) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

The UE 102 may monitor a set of candidates of the DL control channel(s) (e.g., the PCCH (e.g., the PDCCH)). Here, the candidates of DL control channel (s) may be candidates for which the DL control channel(s) may possibly be mapped, assigned, and/or transmitted. For example, a candidate of the DL control channel(s) is composed of one or more control channel elements (CCEs). The term "monitor" means that the UE 102 attempts to decode each DL control channel(s) in the set of candidates of the DL control channel(s) in accordance with all the DCI format(s) to be monitored.

The set of candidates of the DL control channel(s) which the UE 102 monitors may be also referred to as a search space (e.g., DL control channel set etc.). That is, the search space is a set of resource that may possibly be used for transmission of the DL control channel(s).

Here, a common search space (CSS) and a user-equipment search space (USS) are set (or defined, configured) in a region(s) of DL control channel(s) (e.g., the DL control channel monitoring regions). For example, the CSS may be used for transmission of DCI to a plurality of the UEs 102. That is, the CSS may be defined by a resource common to a plurality of the UEs 102. For example, the CSS is composed of CCEs having numbers that are predetermined between the gNB 160 and the UE 102. For example, the CSS is composed of CCEs having indices 0 to 15. Also, the gNB 160 may configure, (by using the PBCH (e.g., the MIB), the PDSCH (i.e., the SIB), and/or the dedicated RRC message), the CSS (e.g., the region of the CSS).

Here, the CSS may be used for transmission of DCI to a specific UE 102. That is, the gNB 160 may transmit, in the CSS, DCI format(s) intended for a plurality of the UEs 102 and/or DCI format(s) intended for a specific UE 102.

The USS may be used for transmission of DCI to a specific UE 102. That is, the USS is defined by a resource dedicated to a certain UE 102. That is, the USS may be defined independently for each UE 102. For example, the USS may be composed of CCEs having numbers that are determined based on a Radio Network Temporary Identifier (RNTI), a slot number in a radio frame, an aggregation level, and/or the like. The RNTI(s) may be assigned by the gNB 160. Namely, each of the USSs corresponding to each of the RNTI(s) described blow may be defined. Also, for example, the gNB 160 may configure, (by using the PBCH (e.g., the MIB), the PDSCH (e.g., the SIN), and/or the dedicated RRC message), the USS (e.g., the region of the USS). Also, the gNB 160 may transmit, in the USS, DCI format(s) intended for a specific UE 102.

Here, the RNTI(s) may include C-RNTI (Cell-RNTI), SI-RNTI (System Information RNTI), P-RNTI (Paging RNTI), RA-RNTI (Random Access-RNTI) and/or Temporary C-RNTI. For example, the C-RNTI may be a unique identification used for identifying RRC connection and scheduling. The SI-RNTI may be used for identifying SI (i.e., SI message) mapped on the Broadcast Control Channel (BCCH) and dynamically carried on DL-SCH. The SI-RNTI may be used for broadcasting of SI. The P-RNTI may be used for transmission of Paging and/or SI change notification. The RA-RNTI may be an identification used for the random access procedure. The Temporary C-RNTI may be used for the random access procedure.

Here, the RNTI(s) assigned to the UE 102 may be used for transmission of DCI (transmission of DL control channel(s)). Specifically, CRC (Cyclic Redundancy Check) parity bits (also referred to simply as CRC), which are generated based on DCI (or the DCI format, and/or the UL grant), are attached to DCI, and, after attachment, the CRC parity bits are scrambled by the RNTI(s). The UE 102 may attempt to decode DCI to which the CRC parity bits scrambled by the RNTI(s) are attached, and detects DL control channel; (e.g., the PCCH (e.g., the PDCCH), the DCI, the DCI format). That is, the UE 102 may decode the DL control channel(s) with the CRC scrambled by the RNTI(s). That is, the UE 102 may monitor the DL control channel(s) with the RNTI(s).

Here, the gNB 160 may transmit, (by using the PBCH (e.g., the MIB), the PDSCH (e.g., the SIB), and/or the dedicated RRC message), seventh information used for configuring one or more occasions. For example, the gNB 160 may transmit the seventh information used for configuring the occasion(s) of DL control channel(s) monitoring with respect to one or more subcarrier spacing(s) of the DL control channel(s). Here, the DL control channel(s) may be the PCCH(s) (e.g., the PDCCH(s)). Also, the one or more subcarrier spacing(s) may be one or more numerologies. Here, the occasion(s) may correspond to a subframe, a slot, a sub-slot, and/or a symbol. Namely, the occasion(s) may correspond to a position(s) (a timing, a time resource, a time location, a time index, an index of the subframe(s), the slot(s), the sub-slot(s), and/or the symbol(s)).

For example, the subcarrier spacing(s) of the DL control channel(s) in the occasion(s) may be defined, in advance, by the specification and known information between the gNB 160 and the UE 102. For example, the subcarrier(s) of the DL control channel(s) in the occasion(s) may be depend on a frequency range, and defined. Namely, the UE 102 may monitor the DL control channel(s) of the predetermined subcarrier spacing (e.g., by the specification) in the configured occasion(s). Namely, the UE 102 may monitor, based on the predetermined subcarrier spacing(s), the DL control channel(s) in the configured occasion(s). Also, the subcarrier spacing(s) of the DL control channel(s) in the occasion(s) may be configured by the gNB 160. For example, the gNB 160 may configure the subcarrier spacing and/or the occasion(s), the UE 102 may monitor the DL control channel(s) of the configured subcarrier spacing(s) in the configured occasion(s). Namely, the UE 102 may monitor, based on the configured subcarrier spacing(s), the DL control channel(s) in the configured occasion(s).

Also, the gNB 160 may configure a first occasion(s) corresponding to a first subcarrier spacing(s) and a second occasion(s) corresponding to a second subcarrier spacing(s). Namely, the first occasion(s) may be configured for monitoring the DL control channel(s) of the first subcarrier spacing(s). And, the second occasion(s) may be configured for monitoring the DL control channel(s) of the second subcarrier(s). For example, the UE 102 may monitor, based on the first subcarrier spacing(s), the DL control channel(s) in the first occasion(s) (e.g., in a first subframe, in a first slot, in a first sub-slot, and/or in a first symbol). Also, the UE 102 may monitor, based on the second subcarrier spacing(s), the DL control channel(s) in the second occasion(s) (e.g., in a second subframe, in a second slot, in a second sub-slot, and/or in a second symbol). Namely, the occasion(s) with respect to one or more subcarrier spacing(s) of the DL control channel(s) may be dynamically changed (e.g., per subframe, per slot, per sub-slot, and/or per symbol).

Here, the subcarrier spacing of the PDSCH may be configured by using the PBCH (e.g., the MIB), the PDSCH (e.g., the SIB), and/or the dedicated RRC message. Also, the subcarrier spacing of the PDSCH may be indicated by using the detected PDCCH (e.g., the DCI). Also, the subcarrier spacing of the PDSCH may be the same as the detected PDCCH (i.e., the same subcarrier spacing of the occasion(s) in which the UE 102 detects the PDCCH). Namely, the UE 102 may assume the same subcarrier spacing of the PDSCH as the subcarrier spacing of the detected PDCCH.

Also, the subcarrier spacing of the PUSCH may be configured by using the PBCH (e.g., the MIB), the PDSCH (e.g., the SIB), and/or the dedicated RRC message. Also, the subcarrier spacing of the PUSCH may be indicated by using the detected PDCCH (e.g., the DCI). Also, the subcarrier spacing of the PUSCH may be the same as the detected PDCCH (i.e., the same subcarrier spacing of the occasion(s) in which the UE 102 detects the PDCCH). Namely, the UE 102 may assume the same subcarrier spacing of the PUSCH as the subcarrier spacing of the detected PDCCH.

Also, the subcarrier spacing of the PUCCH may be configured by using the PBCH (e.g., the MIB), the PDSCH (e.g., the SIB), and/or the dedicated RRC message. Also, the subcarrier spacing of the PUCCH may be indicated by using the detected PDCCH (e.g., the DCI used for scheduling of the PDSCH and/or the PUSCH). Also, the subcarrier spacing of the PUCCH may be the same as the detected PDCCH (i.e., the same subcarrier spacing of the occasion(s) in which the UE 102 detects the PDCCH (e.g., the DCI used for scheduling of the PDSCH and/or the PUSCH)). Namely, the UE 102 may assume the same subcarrier spacing of the PUCCH as the subcarrier spacing of the detected PDCCH (e.g., the DCI used for scheduling of the PDSCH and/or the PUSCH).

Figure 5:
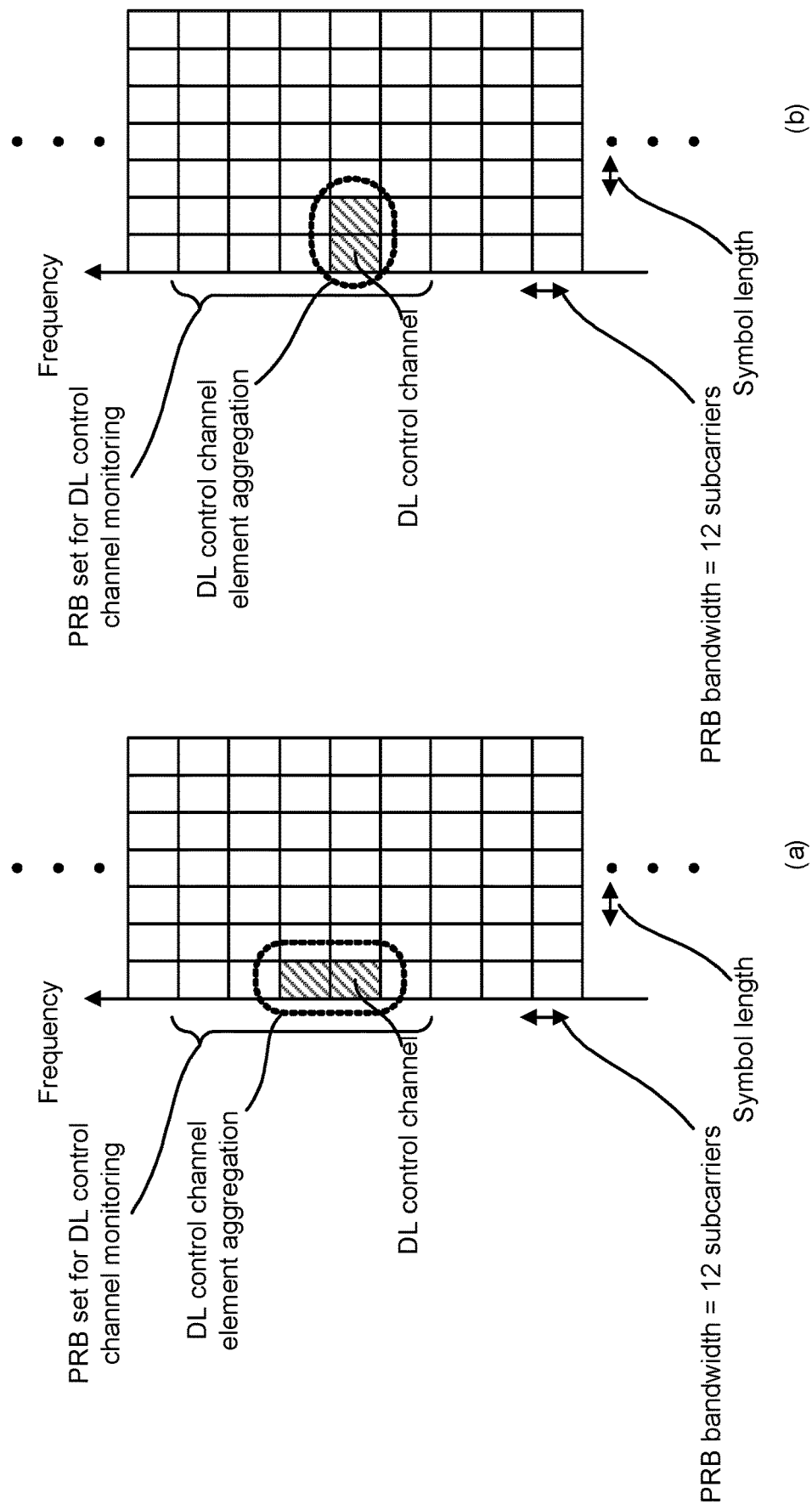
FIG. 5 shows examples of DL control channel which consists of more than one control channel elements.

FIG. 5 shows examples of DL control channels, which may include more than one control channel element. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

Figure 6:
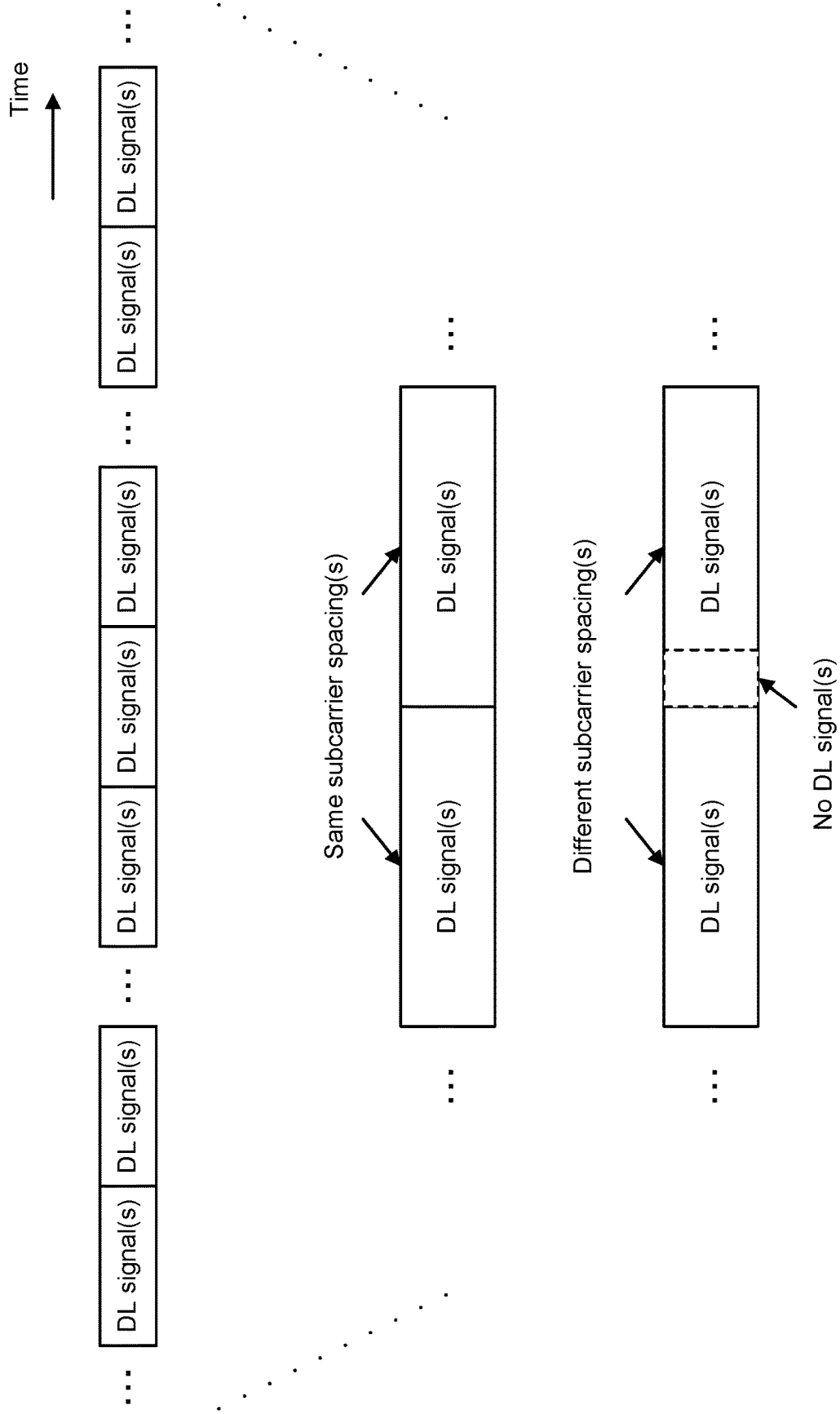
FIG. 6 illustrates an example of uplink (UL) transmissions.

FIG. 6 is an example of downlink and/or uplink signal(s) transmission(s). In FIG. 6, the downlink signal(s) is described for the sake of simple descriptions. However, the invention does not preclude the uplink signal(s). Namely, the invention may be applied to the downlink signal(s) and/or the uplink signal(s) (i.e. a DL/UL signal(s)). Here, the default subcarrier spacing(s) of the DL/UL signal(s) may be defined. For example, the default subcarrier spacing(s) of the DL control channel(s) (e.g., the PDCCH) may be defined. Also, the default subcarrier spacing(s) of the DL shared channel(s) may be defined. Also, for example, the default subcarrier spacing(s) of the UL control channel(s) (e.g., the PUCCH) may be defined. Also, the default subcarrier spacing(s) of the UL shared channel(s) (e.g., the PUSCH) may be defined. Also, as above mentioned, the default subcarrier spacing(s) of the DL SS(s) may be defined (configured and/or indicated). Here, the default subcarrier spacing(s) of the DL control channel(s), the default subcarrier spacing(s) of the DL shared channel(s), the default subcarrier spacing(s) of the UL control channel(s), the default subcarrier spacing(s) of the UL shared channel(s), and/or the default subcarrier spacing(s) of the DL SS(s) described herein may be assumed to be included in the default subcarrier spacing(s) of the DL/UL signal(s) in some implementations for the sake of simple description.

For example, each of the default subcarrier spacing(s) of the DL/UL signal(s) may be defined, in advance, by specification and known information between the gNB 160 and the UE 102. Also, each of the default subcarrier spacing(s) of the DL/UL signal(s) may be configured by using the PBCH (e.g., the MIB), the PDSCH (e.g., the SIB), and/or the dedicated RRC message. Namely, the gNB 160 may transmit, by using the PBCH (e.g., the MIB), the PDSCH (e.g., the SIB), and/or the dedicated RRC message, one or more information used for configuring the one or more default subcarrier spacing(s) of the DL/UL signal(s). For example, as above described, the default subcarrier spacing(s) of the DL SS(s) may be defined, in advance, by the specification and known information between the gNB 160 and the UE 102. And, for example, the default subcarrier spacing(s) of the DL control channel(s), the DL shared channel(s), the UL control channel(s), and/or the UL shared channel(s) may be configured by using the PBCH (e.g., the MIB), the PDSCH (e.g., the SIB), and/or the dedicated RRC message.

Here, each of the default subcarrier spacing(s) of the DL/UL signal(s) may be the same or may be different. For example, the default subcarrier spacing(s) of the DL control channel(s) may be the same as or different from the default subcarrier spacing(s) of the DL shared channel(s), the default subcarrier spacing(s) of the UL shared channel(s), the default subcarrier spacing(s) of the UL control channel(s), and/or the default subcarrier spacing(s) of the DL SS(s). Also, the default subcarrier spacing(s) of the DL shared channel(s) may be the same as or different from the default subcarrier spacing(s) of the UL shared channel(s), the default subcarrier spacing(s) of the UL control channel(s), and/or the default subcarrier spacing(s) of the DL SS(s). Also, the default subcarrier spacing(s) of the UL shared channel(s) may be the same as or different from the default subcarrier spacing(s) of the UL control channel(s), and/or the default subcarrier spacing(s) of the DL SS(s).

Also, the default subcarrier spacing(s) of the UL control channel(s) may be different from default subcarrier spacing(s) of the DL SS(s).

Also, as above described, the UE 102 may monitor (e.g., detect, receive) the DL signal(s) based on an assumption of the subcarrier spacing(s). Here, the subcarrier spacing(s) includes the default subcarrier spacing(s) and/or the configured (and/or indicated) subcarrier spacing(s). Here, the default subcarrier spacing(s) and/or the configured (and/or indicated) subcarrier spacing(s) may be defined, configured and/or indicated as above described. Also, the meaning of the monitoring may include, at least, the meaning of detecting, and/or receiving.

For example, the UE 102 may monitor, in a first timing "n", the first DL signal(s) based on a first subcarrier spacing(s). Also, the UE 102 may monitor, in a second timing "n+1", the second DL signal(s) based on a second subcarrier spacing(s). Here, the first timing "n" may be (i.e., may include) a first subframe "n", a first slot "n", a first sub-slot "n", and/or in a first symbol "n". Also, the second timing "n+1" may be (i.e., may include) a second subframe "n+1", a second slot "n+1", a second sub-slot "n+1", and/or a second symbol "n+1"). Namely, the first timing "n" and the second timing "n+1" may be adjacent in a time (i.e., a time region, a time resource). Also, the first timing "n" may be just before the second timing "n+1". Also, the first timing "n" may be adjacent to the previous timing of the second timing "n+1". Also, the first timing "n" may be the latest timing for the second timing "n+1". Also, the timing "n" may be the last timing for the second timing "n+1". Also, the first DL signal(s) and the second DL signal(s) may be the same or different. Also, the first subcarrier spacing(s) and the second subcarrier spacing(s) may be the same or different.

Here, in a case that the subcarrier spacing(s) of the first DL signal(s) in the first timing(s) and the subcarrier spacing(s) of the second DL signal(s) in the second timing(s) are the same, the UE 102 may monitor the first DL signal(s) based on the first subcarrier spacing(s) in the first timing(s), and may monitor the second DL signal(s) based on the second subcarrier spacing(s) in the second timing(s). Here, the case that the subcarrier spacing(s) of the first DL signal(s) in the first timing(s) and the subcarrier spacing(s) of the second DL signal(s) in the second timing(s) are the same described herein may be assumed to be included in "a case A" in some implementations for the sake of simple description. Namely, in the case A, the UE 102 may assume that a symbol(s) corresponding to a part(s) of symbol(s) of the second DL signal(s) is used for transmitting the second DL signal(s). For example, in the case A, the UE 102 may monitor the second DL signal(s) based on an assumption that a symbol corresponding a first symbol of the second DL signal(s) is used for transmitting the second DL signal(s). Namely, in the case A, the UE 102 may monitor the second DL control signal(s) based on the assumption that the second DL signal(s) is mapped (e.g., allocated) to the first symbol of the search space(s) of the second DL signal(s) (e.g., the UE-specific search space and/or the common search space of the second DL signal(s)). In the case A, the UE 102 may monitor the first symbol of the search space(s) of the second DL signal(s) for detecting (i.e., receiving) the second DL signal(s) (e.g., the DL control channel(s) and/or the DL shared channel(s)).

Also, in a case that the subcarrier spacing(s) of the first DL signal(s) in the first timing(s) and the subcarrier spacing(s) of the second DL signal(s) in the second timing(s) are not the same (i.e., different), the UE 102 may monitor the first DL signal(s) based on the first subcarrier spacing(s) in the first timing(s), and may monitor the second DL signal(s) based on the second subcarrier spacing(s) in the second timing(s). Here, the case that the subcarrier spacing(s) of the first DL signal(s) in the first timing(s) and the subcarrier spacing(s) of the second DL signal(s) in the second timing(s) are not the same (i.e., different) described herein may be assumed to be included in "a case B" in some implementations for the sake of simple description. Namely, in the case B, the UE 102 may assume that the symbol(s) corresponding to the part(s) of symbol(s) of the second DL signal(s) is not used for transmitting the second DL signal(s). For example, in the case B, the UE 102 may monitor the second DL signal(s) based on an assumption that the symbol corresponding the first symbol of the second DL signal(s) is not used for transmitting the second DL signal(s).

Namely, in the case B, the UE 102 may monitor the second DL signal(s) based on an assumption that no DL signal(s) is transmitted in the symbol(s) corresponding the part(s) of symbol(s) of the second DL signal(s). Namely, in the case B, no DL signal(s) may be transmitted in the symbol corresponding to the first symbol for (e.g., reserved for) the second DL signal(s)). Namely, in the case B, the UE 102 may monitor the second DL control signal(s) based on the assumption that the second DL signal(s) is not mapped to the first symbol of the search space(s) of the second DL signal(s) (e.g., the UE-specific search space and/or the common search space of the second DL signal(s)). In the case B, the UE 102 may not monitor (e.g., may not be expected to monitor, may not be required to monitor) the first symbol of the search space(s) of the second DL signal(s) for detecting (i.e., receiving) the second DL signal(s) (e.g., the DL control channel(s) and/or the DL shared channel(s)).

Namely, in the case A, the UE 102 may monitor the second DL signal(s) based on an assumption that there is no gap between the first DL signal(s) and the second DL signal(s). Also, in the case B, the UE 102 may monitor the second DL signal(s) based on an assumption that there is a gap between the first DL signal(s) and the second DL signal(s). And, a length of the gap may be one symbol and/or less than one symbol.

Namely, for example, the UE 102 may switch a behavior for monitoring the DL signal(s) based on whether the subcarrier spacing(s) of the adjacent timings (i.e., the first timing(s) and the second timing(s)) are the same or not (i.e., whether a case is the case A or the case B). For example, in a case that the subcarrier spacing(s) of the adjacent timings are the same (i.e., in the case A), the UE 102 may assume that the symbol corresponding to the first symbol of the second DL signal(s) is used for transmitting the second DL signal(s). Also, for example, in a case that the subcarrier spacing(s) of the adjacent timings (i.e., the first timing(s) and the second timing(s)) are not the same (i.e., in the case B), the UE 102 may assume that the first symbol of the second DL signal(s) is not used for transmitting the second DL signal(s).

Here, only for the configured subcarrier spacing, the switching of the behavior for monitoring may be defined (e.g., configured and/or indicated). For example, only for the RRC connected case, the UE 102 (e.g., the RRC connected mode UE 102) may perform the switching of the behavior for monitoring. Also, for example, the DL control channel(s) (i.e., the DL control channel(s) used for transmitting the first DL signal(s) and/or the second DL signal(s)) monitored based on the switching of the behavior for monitoring may be only the PDCCH with the C-RNTI. Also, the DL control channel(s) (i.e., the DL control channel(s) used for transmitting the first DL signal(s) and/or the second DL signal(s))

monitored based on the switching of the behavior for monitoring may be the PDCCH with the C-RNTI, the PDCCH with the SI-RNTI, the PDCCH with the P-RNTI, the PDCCH with the RA-RNTI, and/or the PDCCH with the temporary C-RNTI.

Also, only for the default subcarrier spacing, the switching of the behavior for monitoring may be defined (e.g., configured and/or indicated). For example, only for the initial cell selection, the UE 102 (e.g., the idle mode UE 102) may perform the switching of the behavior for monitoring. Also, only for the initial cell selection and the case that the configured subcarrier spacing(s) is not configured (i.e., no value of the subcarrier spacing(s) of the corresponding DL signal(s) is configured, the UE 102 may perform the switching of the behavior for monitoring. For example, the DL control channel(s) (i.e., the DL control channel(s) used for transmitting the first DL signal(s) and/or the second DL signal(s)) monitored based on the switching of the behavior for monitoring may be only the PDCCH with the SI-RNTI, the PDCCH with the P-RNTI, the PDCCH with the RA-RNTI, and/or the PDCCH with the temporary C-RNTI.

For example, in a case that the subcarrier spacing(s) of the DL SS(s) (e.g., the subcarrier spacing(s) for the SS block(s) (and/or the SS burst(s), and/or the SS burst set(s))) in the first timing(s) and the subcarrier spacing(s) of the DL control channel(s) in the second timing(s) are the same, the UE 102 may monitor the DL control channel(s) based on the assumption that the DL control channel(s) is mapped to the symbol corresponding to the first symbol of the DL control channel(s). For example, in this case, the UE 102 may monitor the DL control channel(s) based on the assumption that the DL control channel(s) is mapped to the first symbol of the search space(s) of the DL control channel(s) (e.g., the UE-specific search space and/or the common search space of the DL control channel(s)).

Also, for example, in a case that the subcarrier spacing(s) of the DL SS(s) (e.g., the subcarrier spacing(s) for the SS block(s) (and/or the SS burst(s), and/or the SS burst set(s))) in the first timing(s) and the subcarrier spacing of the DL control channel(s) in the second timing(s) are not the same, the UE 102 may monitor the DL control channel(s) based on the assumption that the DL control channel(s) is not mapped to the symbol corresponding to the first symbol of the DL control channel(s). Namely, in this case, the UE 102 may monitor the DL control channel(s) based on the assumption that the DL control channel(s) is not mapped to the first symbol of the search space(s) of the DL control channel(s) (e.g., the UE-specific search space and/or the common search space of the DL control channel(s)).

Also, for example, in a case that the subcarrier spacing(s) of the DL shared channel(s) in the first timing(s) and the subcarrier spacing(s) of the DL control channel(s) in the second timing(s) are the same, the UE 102 may monitor the DL control channel(s) based on the assumption that the DL control channel(s) is mapped to the symbol corresponding to the first symbol of the DL control channel(s). Namely, in this case, the UE 102 may monitor the DL control channel(s) based on the assumption that the DL control channel(s) is mapped to the first symbol of the search space(s) of the DL control channel(s) (e.g., the UE-specific search space and/or the common search space of the DL control channel(s)).

Also, for example, in a case that the subcarrier spacing(s) of the DL shared channel(s) in the first timing(s) and the subcarrier spacing(s) of the DL control channel(s) in the second timing are not the same, the UE 102 may monitor the DL control channel(s) based on the assumption that the DL control channel(s) is not mapped to the symbol corresponding to the first symbol of the DL control channel(s). Namely, in this case, the UE 102 may monitor the DL control channel(s) based on the assumption that the DL control channel(s) is not mapped to the first symbol of the search space of the DL control channel(s) (e.g., the UE-specific search space and/or the common search space of the DL control channel(s)).

Also, for example, in a case that the subcarrier spacing(s) of the first DL control channel(s) in the first timing(s) and the subcarrier spacing(s) of the second DL control channel(s) in the second timing(s) are the same, the UE 102 may monitor the second DL control channel(s) based on the assumption that the second DL control channel(s) is mapped to the symbol corresponding to the first symbol for the second DL control channel(s). Namely, in this case, the UE 102 may monitor the second DL control channel(s) based on the assumption that the second DL control channel(s) is mapped to the first symbol of the search space of the second DL control channel(s) (e.g., the UE-specific search space and/or the common search space of the second DL control channel(s)).

Also, for example, in a case that the subcarrier spacing(s) of the first DL control channel(s) in the first timing(s) and the subcarrier spacing(s) of the second DL control channel(s) in the second timing(s) are not the same, the UE 102 may monitor the second DL control channel(s) based on the assumption that the second DL control channel(s) is not mapped to the symbols corresponding to the first symbol of the second DL control channel(s). Namely, in this case, the UE 102 may monitor the second DL control channel(s) based on the assumption that the second DL control channel(s) is not mapped to the first symbol of the search space of the second DL control channel(s) (e.g., the UE-specific search space and/or the common search space of the second DL control channel(s)).

Here, only in a case that the subcarrier spacing(s) of the DL SS(s) (e.g., the subcarrier spacing(s) of the SS block(s) (and/or the SS burst(s), and/or the SS burst set(s))) in the first timing(s) and the subcarrier spacing(s) of the DL signal(s) (e.g., the DL control channel(s) and/or the DL shared channel(s)) are not the same, the UE 102 may assume that the DL signal(s) is not mapped to the symbol corresponding to the first symbol for the DL signal(s). Namely, in a case except for the case that the subcarrier spacing(s) of the DL SS(s) (e.g., the subcarrier spacing(s) of the SS block(s) (and/or the SS burst(s), and/or the SS burst set(s))) and the subcarrier spacing(s) of the DL signal(s) are not the same, even if the subcarrier spacing(s) of the first DL signal(s) (e.g., the DL control channel(s) and/or the DL shared channel(s)) and the subcarrier spacing(s) of the second DL signal(s) (e.g., the DL control channel(s) and/or the DL shared channel(s)) are not the same, the UE 102 may assume that the second DL signal(s) is mapped to the symbol corresponding to the first symbol of the second DL signal(s).

Namely, the UE 102 may switch the assumption for the behavior for monitoring the DL signal(s) based on the adjacent previous first DL signal(s). Namely, for example, the UE 102 may switch the assumption of the behavior for monitoring the DL signal(s), based on whether the adjacent previous first DL signal(s) is a predetermined DL signal(s) or not (e.g., whether the adjacent previous first DL signal(s) is the DL SS(s) or not). Here, the predetermined DL signal(s) may be defined, in advance, by the specification and known information between the gNB 160 and the UE 102. Also, the predetermined DL signal(s) may be configured by using the PBCH (e.g., the MIB), the PDSCH (e.g., the SIB), and/or the dedicated RRC message.

Also, for example, the UE 102 may switch the assumption of the behavior for monitoring the DL signal(s), based on whether a pair(s) (e.g., a combination(s)) of the subcarrier spacing(s) of the adjacent previous first DL signal(s) and the subcarrier spacing(s) of the second DL signal(s) is a predetermined pair(s) or not. Here, the predetermined pair(s) may be defined, in advance, by the specification and known information between the gNB 160 and the UE 102. Also, the predetermined pair(s) may be configured by using the PBCH (e.g., the MIB), the PDSCH (e.g., the SIB), and/or the dedicated RRC message. For example, the predetermined pair(s) may be (i.e., may include) a pair of 15 kHz (e.g., for the first DL signal(s)) and 60 kHz (e.g., for the second DL signal(s)). Namely, a pair(s) which is not the predetermined pair(s) may be (i.e., may include) a pair of 15 kHz (e.g., for the first DL signal(s)) and 30 kHz (e.g., for the second DL signal(s)).

Namely, the UE 102 may not be expected (e.g., required) to monitor the first symbol of the second DL signal(s) (e.g., the symbol corresponding to the first symbol of the second SL signal) in a case that the subcarrier spacing(s) of the second DL signal(s) is different from the subcarrier spacing(s) of the adjacent precious first DL signal(s). For example, the UE 102 may not be expected (e.g., required) to monitor the first symbol of the search space(s) of the second DL signal(s) (e.g., the UE-specific search space and/or the common search space of the second DL signal(s)) in a case that the subcarrier spacing(s) of the second DL signal(s) is different from the subcarrier spacing(s) of the adjacent previous first DL signal(s). Here, the meaning of the first symbol may be (i.e. may include) the 1st symbol of one or more symbols of the DL signal(s). Namely, the meaning of the first symbol may be the 1st symbol of one or more symbols composing the DL signal(s). Namely, the meaning of the first symbol may be the 1st symbols of one or more symbols to which the DL signal(s) is mapped.

And, for example, in a case that the subcarrier spacing(s) of the adjacent timings (i.e., the first timing(s) and the second timing(s)) are the same (i.e., in the case A), the gNB 160 may use the symbol corresponding to the first symbol of the second DL signal(s) for transmitting the second DL signal(s). Namely, in the case A, the gNB 160 may map the second DL signal(s) to the first symbols of the search space(s) of the second DL signal(s) (e.g., the UE-specific search space and/or the common search space). Also, in a case that the subcarrier spacing(s) of the adjacent timings (i.e., the first timing(s) and the second timing(s)) are not the same (i.e., in the case B), the gNB 160 may not use the symbol corresponding to the first symbol of the second DL signal(s) for transmitting the second DL signal(s). Namely, in the case B, the gNB 160 may not map the second DL signal(s) to the first symbols of the search space(s) of the second DL signal(s) (e.g., the UE-specific search space and/or the common search space).

Also, the gNB 160 may not configure the occasion(s) of the DL control channel(s) for a timing(s) (i.e., the second timing(s)) to which the subcarrier spacing of the second DL signal(s) different from the subcarrier spacing (s) of the first DL signal(s) is defined (configured and/or indicated). For example, the gNB 160 may not configure the occasions of the DL control channel(s) for a timing(s) (i.e., a subframe(s), a slot(s), a sub-slot(s), and/or a symbol(s)) which is immediately after the DL SS(s) (e.g., the SS block(s) (and/or the SS burst(s), and/or the SS burst set(s))). For example, the occasion(s) of the DL control channel(s) may be configured for the timing(s) except for a timing(s) within the SS burst(s) (and/or the SS burst set(s), and/or the SS block(s)). Namely, the gNB 160 may configure the position(s) of the DL signal(s) in which the UE 102 does not monitor the DL signal(s). For example, the gNB 160 may configure the position(s) of DL signal(s) in which the UE 102 does not monitor the DL signal(s) with respect to one or more subcarrier spacing(s) of the DL signal(s).

For example, the UE 102 may always assume, during the SS burst(s) (and/or the SS burst set(s), and/or the SS block(s)), the default subcarrier spacing(s). Namely, the UE 102 may always assume, during the SS burst(s) (and/or the SS burst set(s), and/or the SS block(s)), each of default subcarrier spacing(s) of each DL signal(s) for monitoring each of DL signal(s). And, in a case that the subcarrier spacing(s) (e.g., the occasion(s)) is configured (and/or indicated), the UE 102 may assume, in a duration except for the SS burst(s) (and/or the SS burst set(s), and/or the SS block(s)), the configured (and/or indicated) subcarrier spacing(s) for monitoring the DL signal(s). Namely, in a case that the subcarrier spacing(s) (e.g., the occasion(s)) is configured (and/or indicated), the UE 102 may assume, in a duration except for the SS burst(s) (and/or the SS burst set(s), and/or the SS block(s)), each of the configured subcarrier spacing(s) of each of DL signal(s) for monitoring each of DL signal(s).

Figure 7:
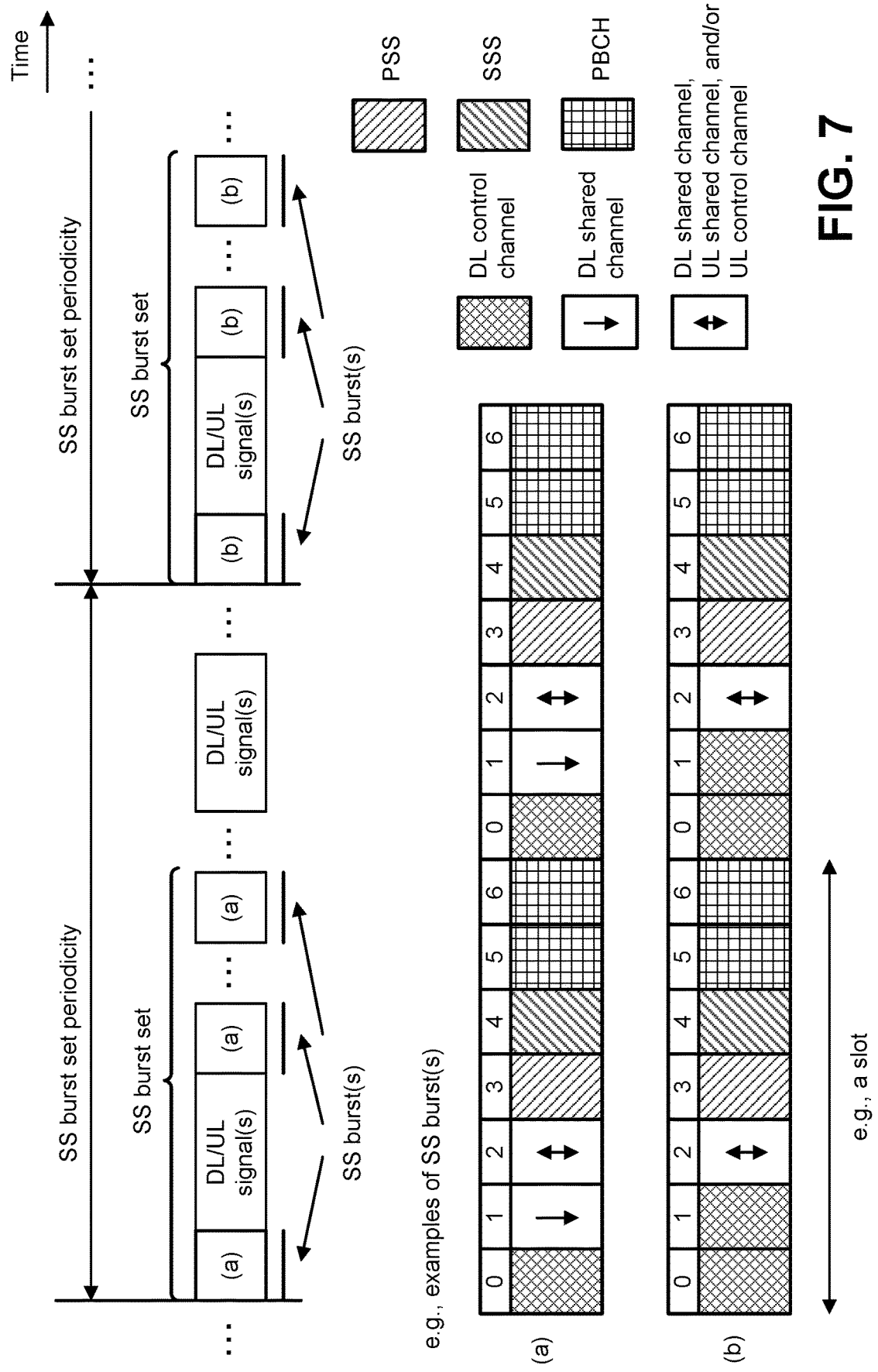
FIG. 7 illustrates an example where one or more UL reference signals (RSs) transmitted on a UL antenna port are mapped to the same resource elements.

FIG. 7 shows an example of downlink and/or uplink signal(s) transmission(s). In FIG. 7, as an example, two types of the SS burst is described. Also, during each types of the SS burst, there may be the DL signal(s) (e.g., the DL control channel(s), the DL shared channel(s)), the UL signal(s) (the UL control channel(s), the UL shared channel(s)), and/or the DL SS(s) (e.g., the PSS, the SSS, the PBCH, and/or the TSS) in a different timing(s). Also, in a duration except for the SS burst(s), there may be the DL signal(s) and/or the UL signal(s) in a different timing(s). Also, in the duration except for the SS burst set(s) (and/or the SS burst(s)), there may be the DL signal(s) and/or the UL signal(s) in a different timing(s).

Here, for example, the number of the DL signal(s) which composes the SS burst may be different per type. Also, the number of the DL SS(s) which composes the SS burst may be different per type. Also, the number of the UL signal(s) which composes the SS burst may be different per type. Also, the position(s) (a timing, a time resource, a time location, a time index, an index of the subframe(s), the slot(s), the sub-slot(s), and/or the symbol(s)) of the DL signal(s) which composes the SS burst may be different per type. Also, the position(s) of the UL signal(s) which composes the SS burst may be different per type. Also, the position(s) of the DL SS(s) which composes the SS burst may be different per type. Here, the position(s) of the DL SS(s) which composes the SS burst may be the same for all type(s) of the SS burst(s).

Here, the type(s) of the SS burst(s) may be defined, in advance, by specification and known information between the gNB 160 and the UE 102. Also, for example, the type(s) of the SS burst(s) may be identified by using the position(s) of the DL SS(s) (e.g., the PSS, the SSS, the BCH, and/or the TSS). Also, the type(s) of the SS burst(s) may be identified by using the position(s) of the SS block(s). For example, the type(s) of the SS burst(s) may be identified by using the position(s) of the SS block(s) within the SS burst(s) (and/or the SS burst set, and/or the SS burst set periodicity). Here, the position(s) of the SS block(s) within the SS burst(s) may be defined, in advance, by specification and known information between the gNB 160 and the UE 102. Also, the position(s) of the SS block(s) within the SS burst(s) may be configured by using the DL SS(s), the SS block(s), the SS burst(s), the SS burst set(s), the SS burst set periodicity, the PBCH (e.g., the MIB), the PDSCH (e.g., the SIB), and/or the dedicated RRC message.

Here, the gNB 160 may transmit information used for configuring (indicating) a position(s) of actually transmitted SS block(s) within the SS burst(s) (and/or the SS burst set(s), and/or the SS burst set periodicity). Namely, the gNB 160 may transmit the information (e.g., the configuration, the indication) of which nominal SS block(s) in the SS burst (and/or the SS burst set(s)) that are the actually transmitted (e.g., the actually SS block(s) transmitted). Here, the number(s) and/or the position(s) of the nominally transmitted SS block(s) within the SS burst(s) (and/or the SS burst set(s), and/or the SS burst set periodicity) may be defined, in advance, by specification and known information between the gNB 160 and/or the UE 102. Also, the number(s) and/or the position(s) of the nominally transmitted SS block(s) within the SS burst(s) may be identified by using by using the DL SS(s), the SS block(s), the SS burst(s), the SS burst set(s), the SS burst set periodicity, the PBCH (e.g., the MIB), the PDSCH (e.g., the SIB), and/or the dedicated RRC message. And, the UE 102 may identify the position(s) of the SS block(s) (e.g., the actually transmitted SS block(s)) within the SS burst(s) (and/or the SS burst set(s), and/or the SS burst set periodicity). And then, the UE 102 may identify the type(s) of the SS burst(s).

Additionally and/or alternatively, the type(s) of the SS burst(s) may be identified by using an sequence(s) (e.g., an index of the sequences) of the DL SS(s). Namely, the UE 102 may identify the sequence(s) of the DL SS(s) (e.g., the sequence(s) of the actually transmitted SS block(s)) within the SS burst(s) (and/or the SS burst set(s), and/or the SS burst periodicity). And then, the UE 102 may identify the type(s) of the SS burst(s).

Additionally and/or alternatively, the type(s) of the SS burst(s) may be identified by using the position(s) of the SS burst(s). For example, the type(s) of the SS burst(s) may be identified by using the position(s) of the SS burst(s) within the SS burst set(s) (and/or the SS burst set periodicity). Here, the position(s) of the SS burst(s) may be defined, in advance, by specification and known information between the gNB 160 and the UE 102. Also, the position(s) of the SS burst(s) may be configured by using the DL SS(s), the SS block(s), the SS burst(s), the SS burst set(s), the SS burst set periodicity, the PBCH (e.g., the MIB), the PDSCH (e.g., the SIB), and/or the dedicated RRC message. Here, the gNB 160 may transmit information used for configuring (indicating) the position(s) of the SS burst(s) (and/or the SS burst set(s)) which the actually transmitted SS block(s) within. Namely, the gNB 160 may transmit the information (e.g., the configuration, the indication) of which the SS burst (and/or the SS burst set(s)) that are actually transmitted (e.g., actually SS block(s) transmitted) within the nominal SS block(s). Namely, the UE 102 may identify the position(s) of the SS burst(s) (e.g., the SS burst(s) which is used for actual transmission(s) of SS block(s)) within the SS burst set(s) (and/or the SS burst set periodicity). And then, the UE 102 may identify the type(s) of the SS burst(s).

Additionally and/or alternatively, the type(s) of the SS burst(s) may be identified by using the SS periodicity configuration. As above mentioned, the UE 102 may identify (i.e., determine) the SS periodicity configuration based on the information transmitted by the gNB 160. And then, the UE 102 may identity the type of the SS burst(s).

Additionally and/or alternatively, the type(s) of the SS burst(s) may be configured by using the DL SS(s), the SS block(s), the SS burst(s), the SS burst set(s), the SS burst set periodicity, the PBCH (e.g., the MIB), the PDSCH (e.g., the SIB), and/or the dedicated RRC message. Namely, the gNB 160 may transmit information used for configuring (indicating) the type(s) of the SS burst(s). And then, the UE 102 may identify the type(s) of the SS burst(s) based on the information.

Also, within the SS burst(s) (and/or the SS burst set(s)), the default subcarrier spacing(s) of each of the DL/UL signals (e.g., each of the DL signals, and/or each of the UL signals) may be defined. For example, within the SS burst(s) (and/or the SS burst set(s)), the default subcarrier spacing(s) of the DL control channel(s) may be defined, and may be the same as or different from the default subcarrier spacing(s) of the DL shared channel(s), the default subcarrier spacing(s) of the UL shared channel(s), the default subcarrier spacing(s) of the UL control channel(s), and/or the default subcarrier spacing(s) of the DL SS(s). Also, within the SS burst (s) (and/or the SS burst set(s)), the default subcarrier spacing(s) of the DL shared channel(s) may be defined, and may be the same as or different from the default subcarrier spacing(s) of the UL shared channel(s), the default subcarrier spacing(s) of the UL control channel(s), and/or the default subcarrier spacing(s) of the DL SS(s). Also, within the SS burst (s) (and/or the SS burst set(s)), the default subcarrier spacing(s) of the UL shared channel(s) may be defined, and may be the same as or different from the default subcarrier spacing(s) of the UL control channel(s), and/or the default subcarrier spacing(s) of the DL SS(s). Also, within the SS burst (s) (and/or the SS burst set(s)), the default subcarrier spacing(s) of the UL control channel(s) may be different from default subcarrier spacing(s) of the DL SS(s).

Namely, with the SS burst(s) (and/or the SS burst set(s)), the default subcarrier spacing(s) of each of the DL/UL signals (e.g., each of the DL signal, and/or each of the UL signals) may be the same. For example, within the SS burst(s) (and/or the SS burst set(s)), a single default subcarrier spacing may be defined for each of the DL/UL signals. Namely, during the SS burst(s) (and/or the SS burst set(s)), the default subcarrier spacing(s) of one or more DL signals (e.g., a part of the DL signal(s), and/or all of the DL signals) may be the same. Namely, the default subcarrier spacing(s) of the one or more the DL signals which belong to the SS burst(s) (and/or the SS burst set(s)) may be the same. Also, during the SS burst(s) (and/or the SS burst set(s)), the default subcarrier spacing(s) of one or more UL signals (e.g., a part of the UL signal(s), and/or all of the UL signals) may be the same. Namely, the default subcarrier spacing(s) of the one or more the UL signals which belong to the SS burst(s) (and/or the SS burst set(s)) may be the same.

Namely, during the SS burst(s) (and/or the SS burst set(s)), the UE 102 may assume the same subcarrier spacing(s) for the one or more DL/UL signals (e.g., the DL control channel(s), the DL shared channel(s), the UL control channel(s), and/or the UL shared channel(s)). For example, during the SS burst(s) (and/or the SS burst set(s)), the UE 102 may assume the default subcarrier spacing(s) of the DL SS(s) as the subcarrier spacing(s) for the SS burst(s) (and/or the SS burst set(s)). For example, the default subcarrier spacing(s) for the SS burst(s) (and/or the SS burst set(s)) may be defined, in advance, by the specification and known information between the gNB 160 and the UE 102. Also, the default subcarrier spacing(s) for the SS burst(s) (and/or the SS burst set(s)) may be configured by using the DL SS(s), the SS block(s), the SS burst(s), the SS burst set(s), the SS burst set periodicity, the PBCH (e.g., the MIB), the PDSCH (e.g., the SIB), and/or the dedicated RRC message. Namely, the default subcarrier spacing(s) of the DL/UL signal(s) which belong to the SS burst(s) (and/or the SS burst set(s)) may be defined, in advance, by the specification and between the gNB 160 and the UE 102. Also, the default subcarrier spacing(s) of the DL/UL signal(s) which belong to the SS burst(s) (and/or the SS burst set(s)) may be configured by using the DL SS(s), the SS block(s), the SS burst(s), the SS burst set(s), the SS burst set periodicity, the PBCH (e.g., the MIB), the PDSCH (e.g., the SIB), and/or the dedicated RRC message.

Also, the default subcarrier spacing(s) of the DL/UL signal(s) which does not belong to the SS burst(s) (and/or the SS burst set(s)) may be defined, in advance, by the specification and known information between the gNB 160 and the UE 102. Here, the default subcarrier spacing(s) of the DL/UL signal(s) which does not belong to the SS burst(s) (and/or the SS burst set(s)) may be configured by using the DL SS(s), the SS block(s), the SS burst(s), the SS burst set(s), the SS burst set periodicity, the PBCH (e.g., the MIB), the PDSCH (e.g., the SIB), and/or the dedicated RRC message.

For example, the default subcarrier spacing(s) of the DL/UL signal(s) which does not belong to the SS burst(s) (and/or the SS burst set(s)) may be a different subcarrier spacing(s) from the default subcarrier spacing(s) for the default subcarrier spacing(s) of the DL SS(s) (e.g., the default subcarrier spacing(s) for the SS burst(s) (and/or the SS burst set(s)). For example, for the DL control channel(s) which does not belong to the SS burst(s) (and/or the SS burst set(s)), the UE 102 may assume the first default subcarrier spacing(s). Also, for the DL shared channel(s) which does not belong to the SS burst(s) (and/or the SS burst set(s)), the UE 102 may assume the second default subcarrier spacing(s). Also, for the UL control channel(s) which does not belong to the SS burst(s) (and/or the SS burst set(s)), the UE 102 may assume the third default subcarrier spacing(s). Also, for the UL shared channel(s) which does not belong to the SS burst(s) (and/or the SS burst set(s)), the UE 102 may assume the fourth default subcarrier spacing(s). Here, the first default subcarrier spacing, the second default subcarrier spacing, the third subcarrier spacing, and/or the fourth subcarrier spacing may be the same or different.

Here, as above described, in the case A, the UE 102 may monitor the second DL signal(s) based on the assumption that the symbol(s) corresponding to the part(s) of symbol(s) of the second DL signal(s) is used for transmitting the second DL signal(s). Namely, in the case A, the UE 102 may monitor the second DL signal(s) based on the assumption that the symbol(s) corresponding to the first symbol(s) of the second DL signal(s) is used for transmitting the second DL signal(s). Also, in the case B, the UE 102 may monitor the second DL signal(s) based on the assumption that the symbol(s) corresponding to the part(s) of symbol(s) of the second DL signal(s) is not used for transmitting the second DL signal(s). Namely, in the case B, the UE 102 may monitor the second DL signal(s) based on the assumption that the symbol(s) corresponding to the first symbol(s) of the second DL signal(s) is not used for transmitting the second DL signal(s).

Figure 8:
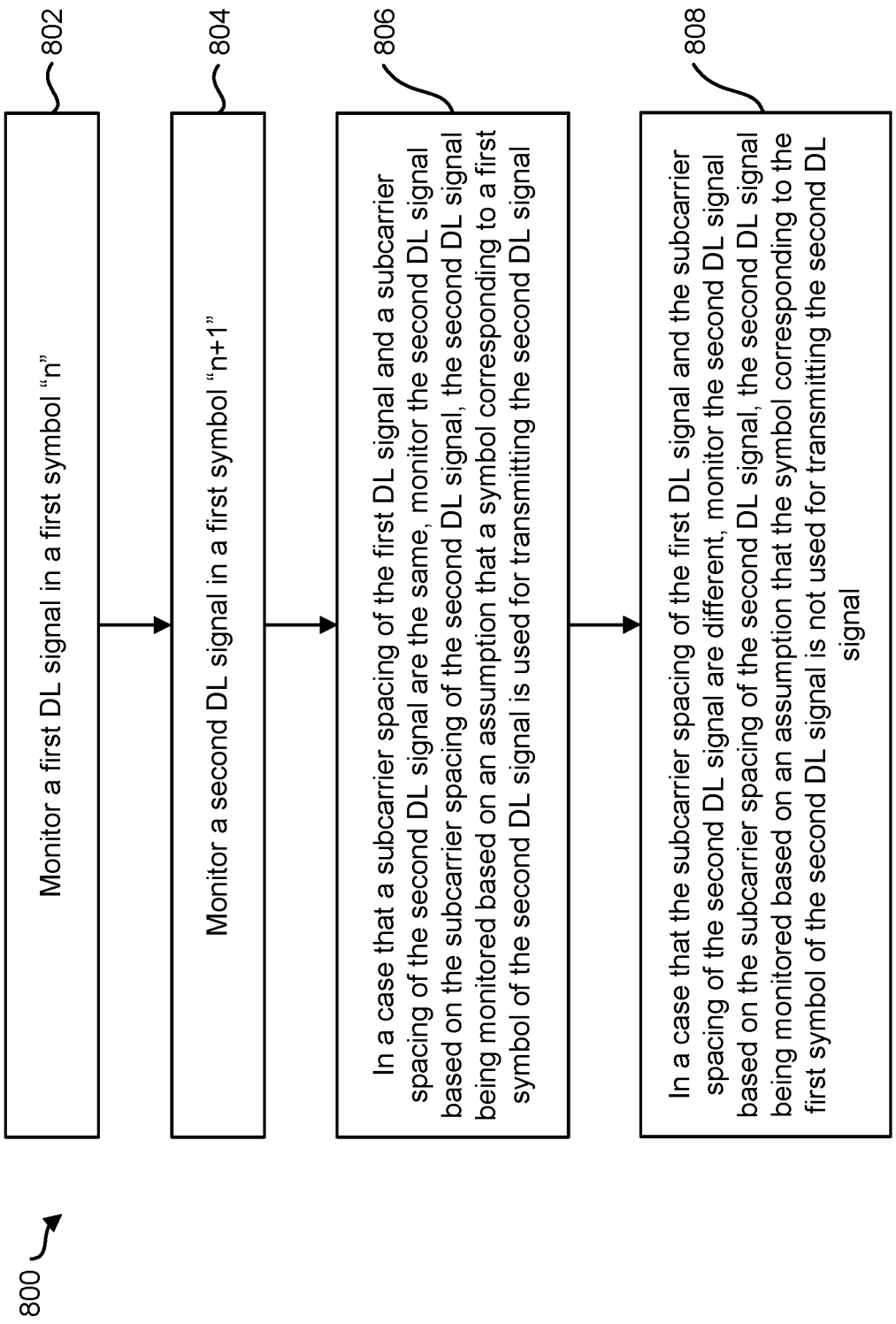
FIG. 8 is a flow diagram illustrating a method by a UE.

FIG. 8 is a flow diagram illustrating a method 800 by a UE 102. The UE 102 may communicate with one or more gNBs 160 in a wireless communication network. In one implementation, the wireless communication network may include an LTE network and/or a 5th generation wireless communication network.

The UE 102 may monitor 802 a first DL signal in a first symbol "n". The UE 102 may monitor 804 a second DL signal in a first symbol "n+1".

In a case that a subcarrier spacing of the first DL signal and a subcarrier spacing of the second DL signal are the same, the UE 102 may monitor 806 the second DL signal based on the subcarrier spacing of the second DL signal, the second DL signal being monitored based on an assumption that a symbol corresponding to a first symbol of the second DL signal is used for transmitting the second DL signal.

In a case that the subcarrier spacing of the first DL signal and the subcarrier spacing of the second DL signal are different, the UE 102 may monitor 808 the second DL signal based on the subcarrier spacing of the second DL signal, the second DL signal being monitored based on an assumption that the symbol corresponding to the first symbol of the second DL signal is not used for transmitting the second DL signal.

Figure 9:
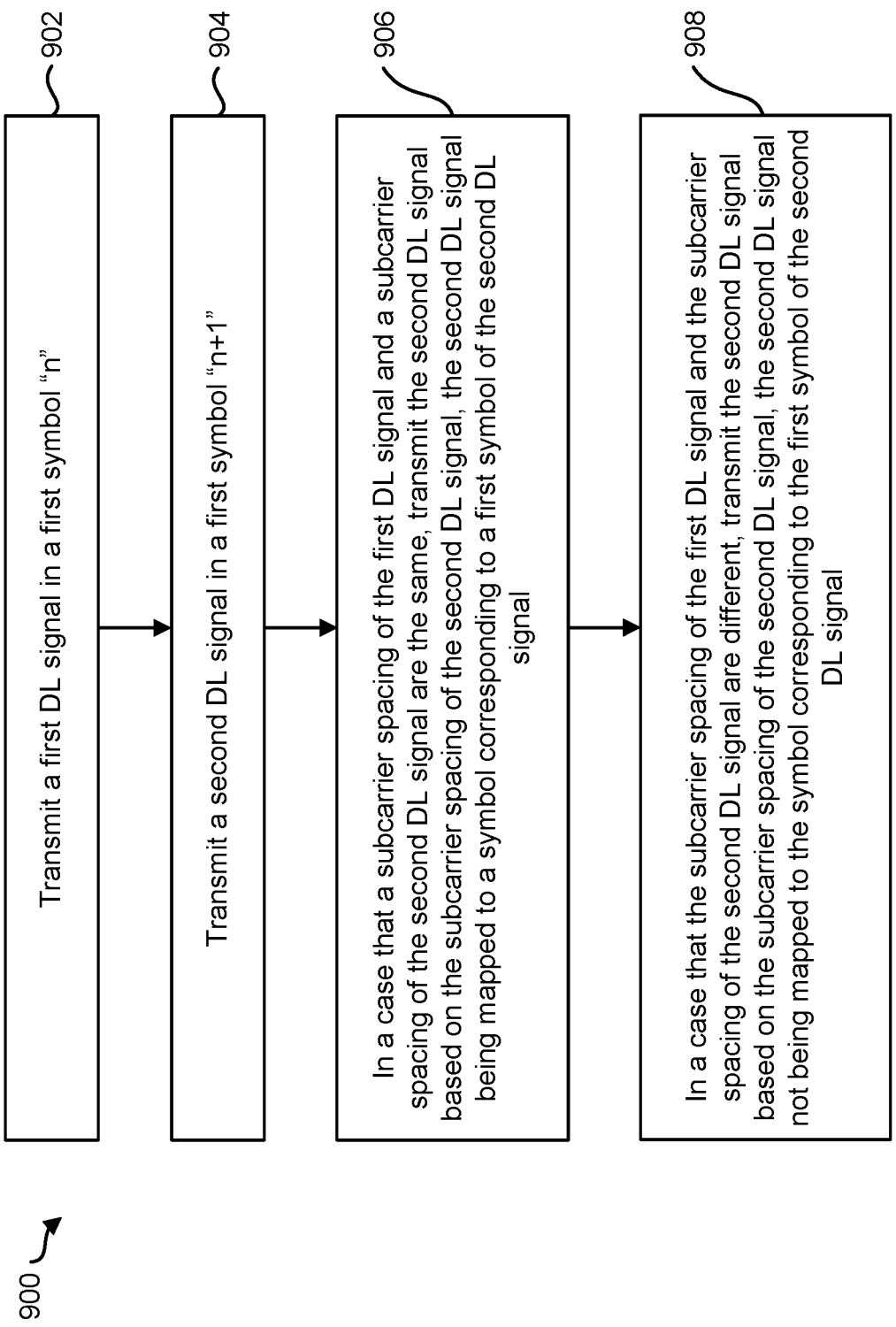
FIG. 9 is a flow diagram illustrating a method by a gNB.

FIG. 9 is a flow diagram illustrating a method 900 by a gNB 160. The gNB 160 may communicate with one or more UEs 102 in a wireless communication network. In one implementation, the wireless communication network may include an LTE network and/or a 5th generation wireless communication network.

The gNB 160 may transmit 902 a first DL signal in a first symbol "n". The gNB 160 may transmit 904 a second DL signal in a first symbol "n+1".

In a case that a subcarrier spacing of the first DL signal and a subcarrier spacing of the second DL signal are the same, the gNB 160 may transmit 906 the second DL signal based on the subcarrier spacing of the second DL signal, the second DL signal being mapped to a symbol corresponding to a first symbol of the second DL signal.

In a case that the subcarrier spacing of the first DL signal and the subcarrier spacing of the second DL signal are different, the gNB 160 may transmit the second DL signal based on the subcarrier spacing of the second DL signal, the second DL signal not being mapped to the symbol corresponding to the first symbol of the second DL signal.

Figure 10:
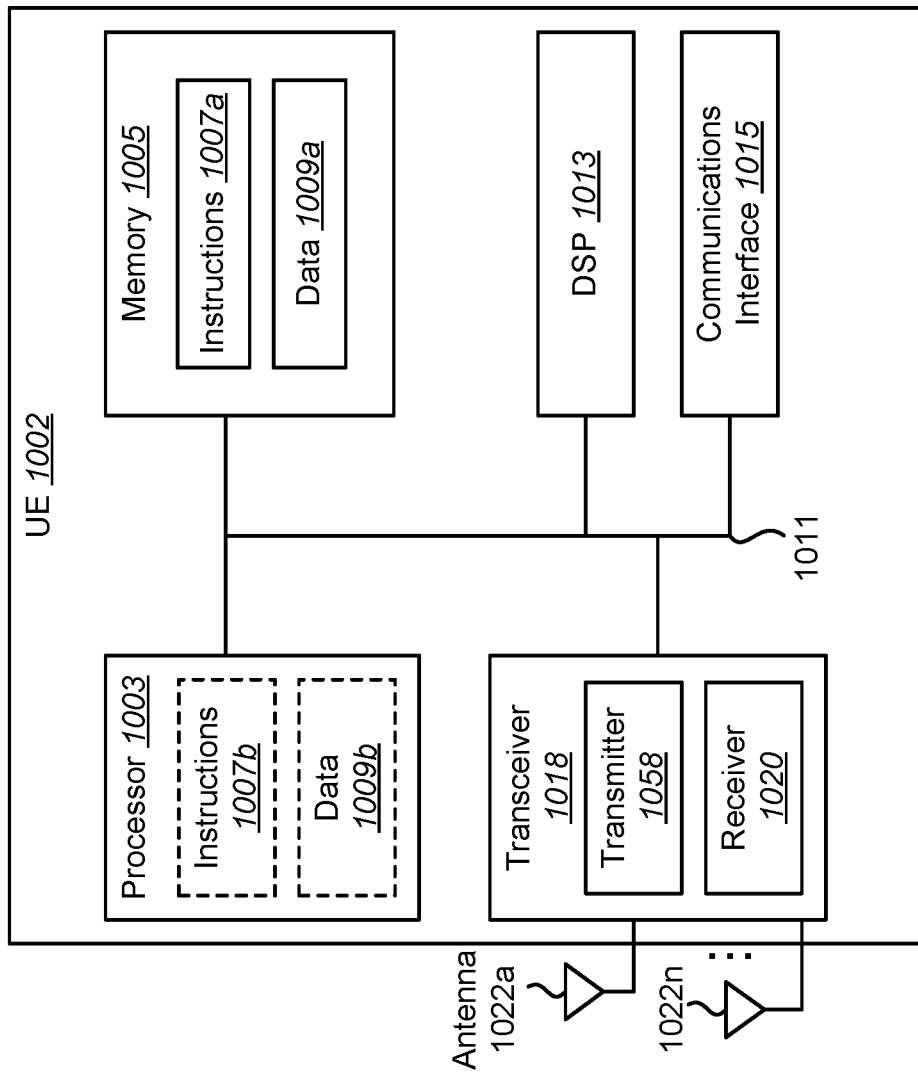
FIG. 10 illustrates various components that may be utilized in a UE.

FIG. 10 illustrates various components that may be utilized in a UE 1002. The UE 1002 described in connection with FIG. 10 may be implemented in accordance with the UE 102 described in connection with FIG. 1. The UE 1002 includes a processor 1003 that controls operation of the UE 1002. The processor 1003 may also be referred to as a central processing unit (CPU). Memory 1005, which may include read-only memory (ROM), random access memory (RAM), a combination of the two or any type of device that may store information, provides instructions 1007a and data 1009a to the processor 1003. A portion of the memory 1005 may also include non-volatile random access memory (NVRAM). Instructions 1007b and data 1009b may also reside in the processor 1003. Instructions 1007b and/or data 1009b loaded into the processor 1003 may also include instructions 1007a and/or data 1009a from memory 1005 that were loaded for execution or processing by the processor 1003. The instructions 1007b may be executed by the processor 1003 to implement the methods described above.

The UE 1002 may also include a housing that contains one or more transmitters 1058 and one or more receivers 1020 to allow transmission and reception of data. The transmitter(s) 1058 and receiver(s) 1020 may be combined into one or more transceivers 1018. One or more antennas 1022a-n are attached to the housing and electrically coupled to the transceiver 1018.

The various components of the UE 1002 are coupled together by a bus system 1011, which may include a power bus, a control signal bus and a status signal bus, in addition to a data bus. However, for the sake of clarity, the various buses are illustrated in FIG. 10 as the bus system 1011. The UE 1002 may also include a digital signal processor (DSP) 1013 for use in processing signals. The UE 1002 may also include a communications interface 1015 that provides user access to the functions of the UE 1002. The UE 1002 illustrated in FIG. 10 is a functional block diagram rather than a listing of specific components.

Figure 11:
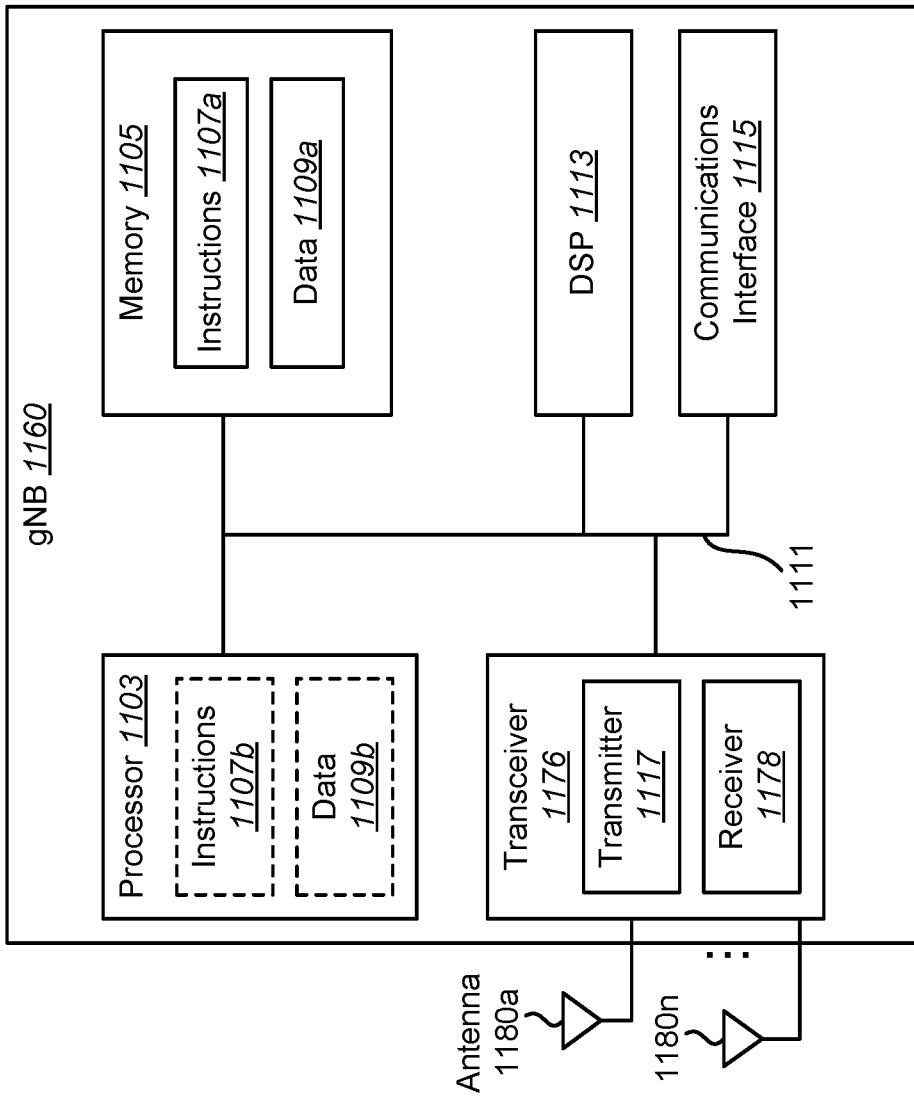
FIG. 11 illustrates various components that may be utilized in a gNB.

FIG. 11 illustrates various components that may be utilized in a gNB 1160. The gNB 1160 described in connection with FIG. 11 may be implemented in accordance with the gNB 160 described in connection with FIG. 1. The gNB 1160 includes a processor 1103 that controls operation of the gNB 1160. The processor 1103 may also be referred to as a central processing unit (CPU). Memory 1105, which may include read-only memory (ROM), random access memory (RAM), a combination of the two or any type of device that may store information, provides instructions 1107a and data 1109a to the processor 1103. A portion of the memory 1105 may also include non-volatile random access memory (NVRAM). Instructions 1107b and data 1109b may also reside in the processor 1103. Instructions 1107b and/or data 1109b loaded into the processor 1103 may also include instructions 1107a and/or data 1109a from memory 1105 that were loaded for execution or processing by the processor 1103. The instructions 1107b may be executed by the processor 1103 to implement the methods described above.

The gNB 1160 may also include a housing that contains one or more transmitters 1117 and one or more receivers 1178 to allow transmission and reception of data. The transmitter(s) 1117 and receiver(s) 1178 may be combined into one or more transceivers 1176. One or more antennas 1180a-n are attached to the housing and electrically coupled to the transceiver 1176.

The various components of the gNB 1160 are coupled together by a bus system 1111, which may include a power bus, a control signal bus and a status signal bus, in addition to a data bus. However, for the sake of clarity, the various buses are illustrated in FIG. 11 as the bus system 1111. The gNB 1160 may also include a digital signal processor (DSP) 1113 for use in processing signals. The gNB 1160 may also include a communications interface 1115 that provides user access to the functions of the gNB 1160. The gNB 1160 illustrated in FIG. 11 is a functional block diagram rather than a listing of specific components.

Figure 12:
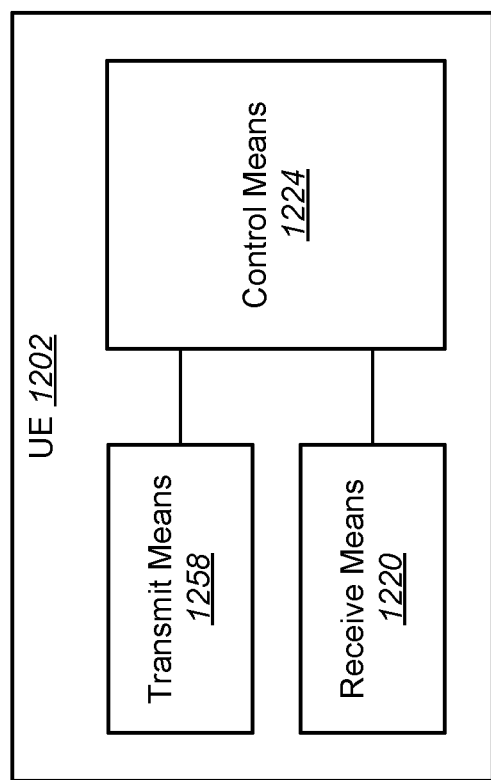
FIG. 12 is a block diagram illustrating one implementation of a UE in which systems and methods for performing uplink transmissions may be implemented.

FIG. 12 is a block diagram illustrating one implementation of a UE 1202 in which systems and methods for performing uplink transmissions may be implemented. The UE 1202 includes transmit means 1258, receive means 1220 and control means 1224. The transmit means 1258, receive means 1220 and control means 1224 may be configured to perform one or more of the functions described in connection with FIG. 1 above. FIG. 10 above illustrates one example of a concrete apparatus structure of FIG. 12. Other various structures may be implemented to realize one or more of the functions of FIG. 1. For example, a DSP may be realized by software.

Figure 13:
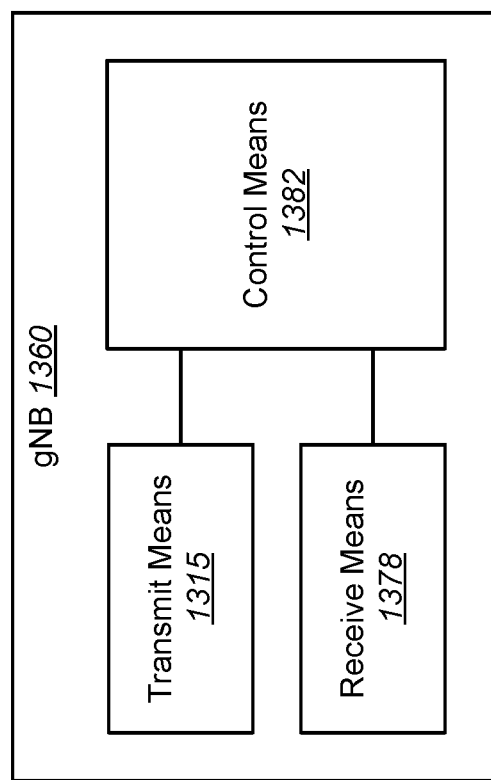
FIG. 13 is a block diagram illustrating one implementation of a gNB in which systems and methods for performing uplink transmissions may be implemented.

FIG. 13 is a block diagram illustrating one implementation of a gNB 1360 in which systems and methods for performing uplink transmissions may be implemented. The gNB 1360 includes transmit means 1317, receive means 1378 and control means 1382. The transmit means 1317, receive means 1378 and control means 1382 may be configured to perform one or more of the functions described in connection with FIG. 1 above. FIG. 11 above illustrates one example of a concrete apparatus structure of FIG. 13. Other various structures may be implemented to realize one or more of the functions of FIG. 1. For example, a DSP may be realized by software.

Figure 14:
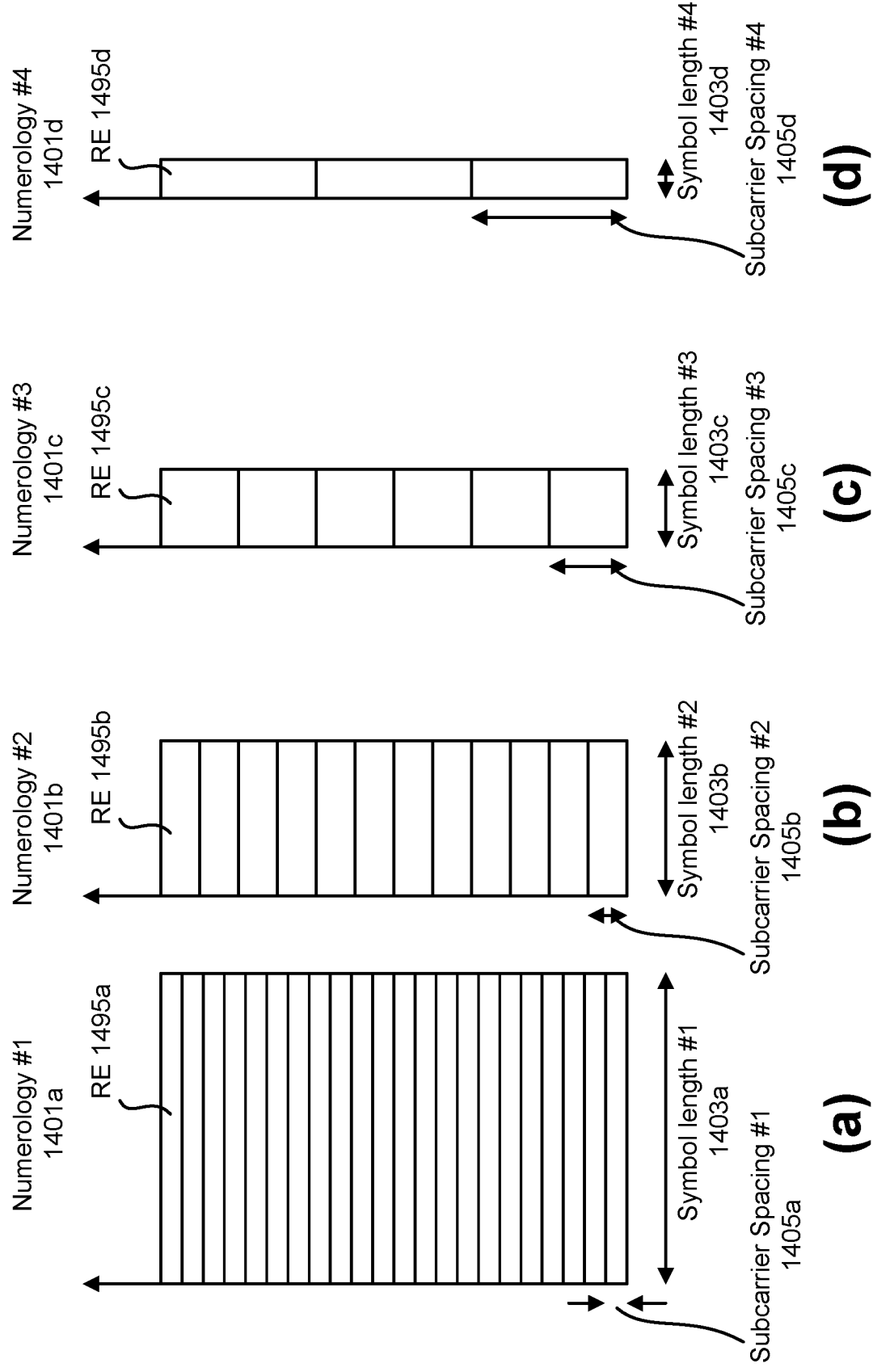
FIG. 14 shows examples of several numerologies.

FIG. 14 shows examples of several numerologies 1401. The numerology #1 1401a may be a basic numerology (e.g., a reference numerology). For example, a RE 1495a of the basic numerology 1401a may be defined with subcarrier spacing 1405a of 15 kHz in frequency domain and 2048 Ts+CP length (e.g., 160 Ts or 144 Ts) in time domain (i.e., symbol length #1 1403a), where Ts denotes a baseband sampling time unit defined as 1/(15000*2048) seconds. For the i-th numerology, the subcarrier spacing 1405 may be equal to $15*2^i$ and the effective OFDM symbol length $2048*2^{-i}*Ts$. It may cause the symbol length is $2048*2^{-i}*Ts+CP$ length (e.g., $160*2^{-i}*Ts$ or $144*2^{-i}*Ts$). In other words, the subcarrier spacing of the i+1-th numerology is a double of the one for the i-th numerology, and the symbol length of the i+1-th numerology is a half of the one for the i-th numerology. FIG. 14 shows four numerologies, but the system may support another number of numerologies. Furthermore, the system does not have to support all of the 0-th to the I-th numerologies, i=0, 1, . . . , I.

Figure 15:
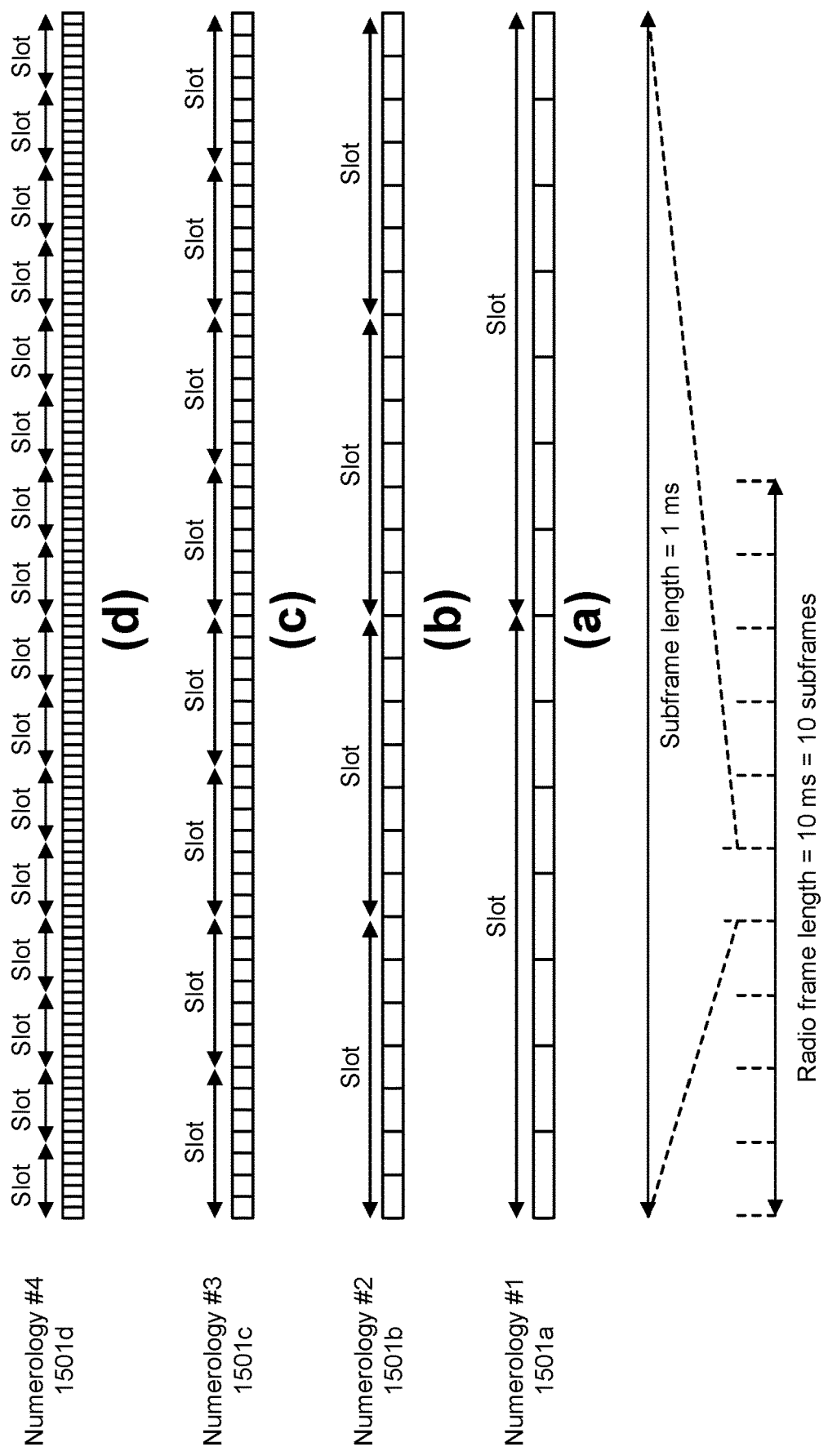
FIG. 15 shows examples of subframe structures for the numerologies that are shown in FIG. 14.

FIG. 15 shows examples of subframe structures for the numerologies 1501 that are shown in FIG. 14. Given that a slot 283 includes $N^{DL}_{symb}$ (or $N^{UL}_{symb}$)=7 symbols, the slot length of the i+l-th numerology 1501 is a half of the one for the i-th numerology 1501, and eventually the number of slots 283 in a subframe (i.e., 1 ms) becomes double. It may be noted that a radio frame may include 10 subframes, and the radio frame length may be equal to 10 ms.

Figure 16:
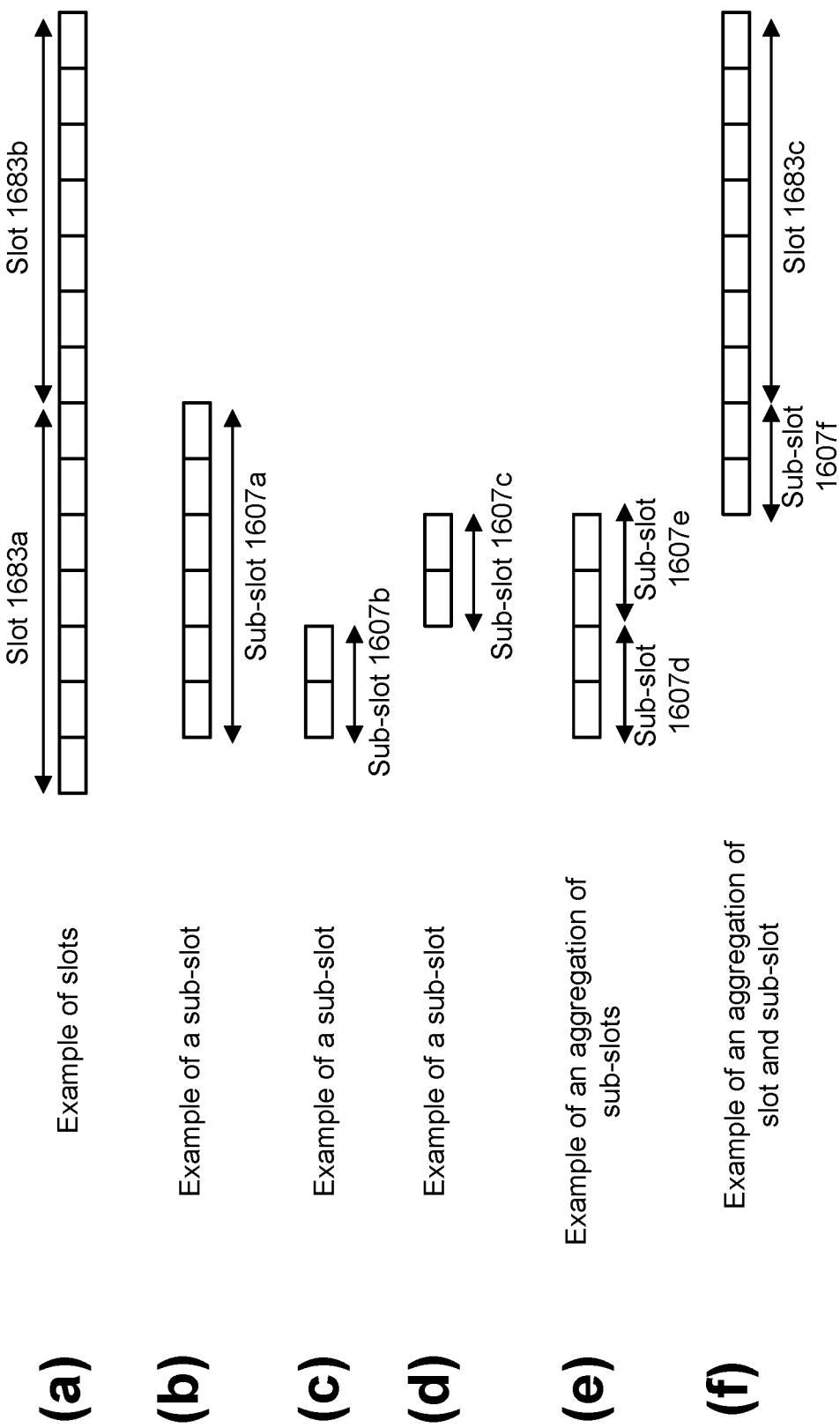
FIG. 16 shows examples of slots and sub-slots.

FIG. 16 shows examples of slots 1683 and sub-slots 1607. If a sub-slot 1607 is not configured by higher layer, the UE 102 and the eNB/gNB 160 may only use a slot 1683 as a scheduling unit. More specifically, a given transport block may be allocated to a slot 1683. If the sub-slot 1607 is configured by higher layer, the UE 102 and the eNB/gNB 160 may use the sub-slot 1607 as well as the slot 1683. The sub-slot 1607 may include one or more OFDM symbols. The maximum number of OFDM symbols that constitute the sub-slot 1607 may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot 1607 may start at any symbol within a slot 1683 unless it collides with a control channel. There could be restrictions of mini-slot length based on restrictions on starting position. For example, the sub-slot 1607 with the length of $N^{DL}_{symb}-1$ (or $N^{UL}_{symb}-1$) may start at the second symbol in a slot 1683. The starting position of a sub-slot 1607 may be indicated by a physical layer control channel (e.g., by DCI format). Alternatively, the starting position of a sub-slot 1607 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot 1607.

In cases when the sub-slot 1607 is configured, a given transport block may be allocated to either a slot 1683, a sub-slot 1607, aggregated sub-slots 1607 or aggregated sub-slot(s) 1607 and slot 1683. This unit may also be a unit for HARQ-ACK bit generation.

Figure 17:
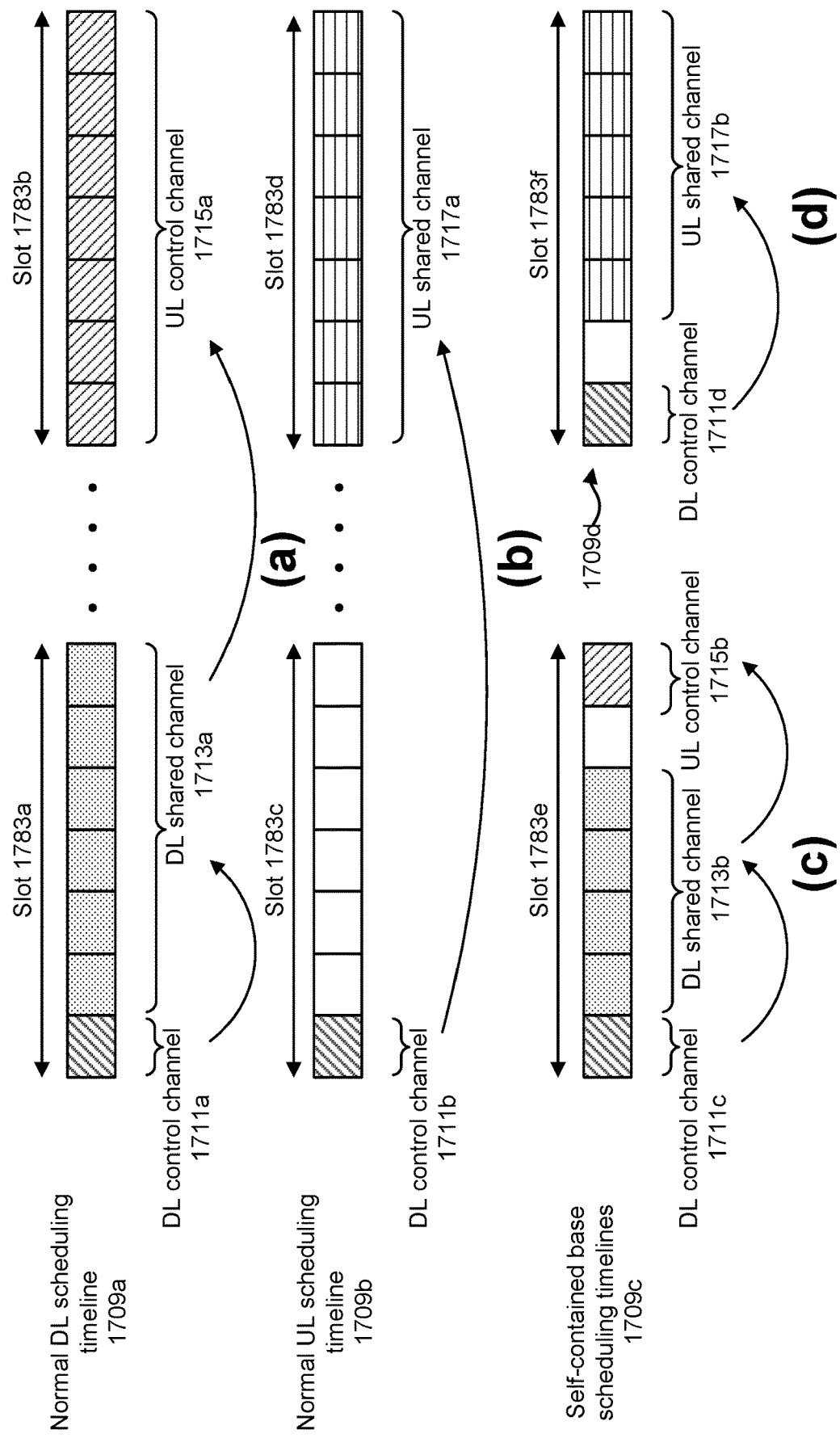
FIG. 17 shows examples of scheduling timelines.

FIG. 17 shows examples of scheduling timelines 1709. For a normal DL scheduling timeline 1709a, DL control channels are mapped the initial part of a slot 1783a. The DL control channels 1711 schedule DL shared channels 1713a in the same slot 1783a. HARQ-ACKs for the DL shared channels 1713a (i.e., HARQ-ACKs each of which indicates whether or not transport block in each DL shared channel 1713a is detected successfully) are reported via UL control channels 1715a in a later slot 1783b. In this instance, a given slot 1783 may contain either one of DL transmission and UL transmission.

For a normal UL scheduling timeline 1709b, DL control channels 1711b are mapped the initial part of a slot 1783c. The DL control channels 1711b schedule UL shared channels 1717a in a later slot 1783d. For these cases, the association timing (time shift) between the DL slot 1783c and the UL slot 1783d may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 1709c, DL control channels 1711c are mapped to the initial part of a slot 1783e. The DL control channels 1711c schedule DL shared channels 1713b in the same slot 1783e. HARQ-ACKs for the DL shared channels 1713b are reported in UL control channels 1715b, which are mapped at the ending part of the slot 1783e.

For a self-contained base UL scheduling timeline 1709d, DL control channels 1711d are mapped to the initial part of a slot 1783f. The DL control channels 1711d schedule UL shared channels 1717b in the same slot 1783f. For these cases, the slot 1783f may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

Figure 18:
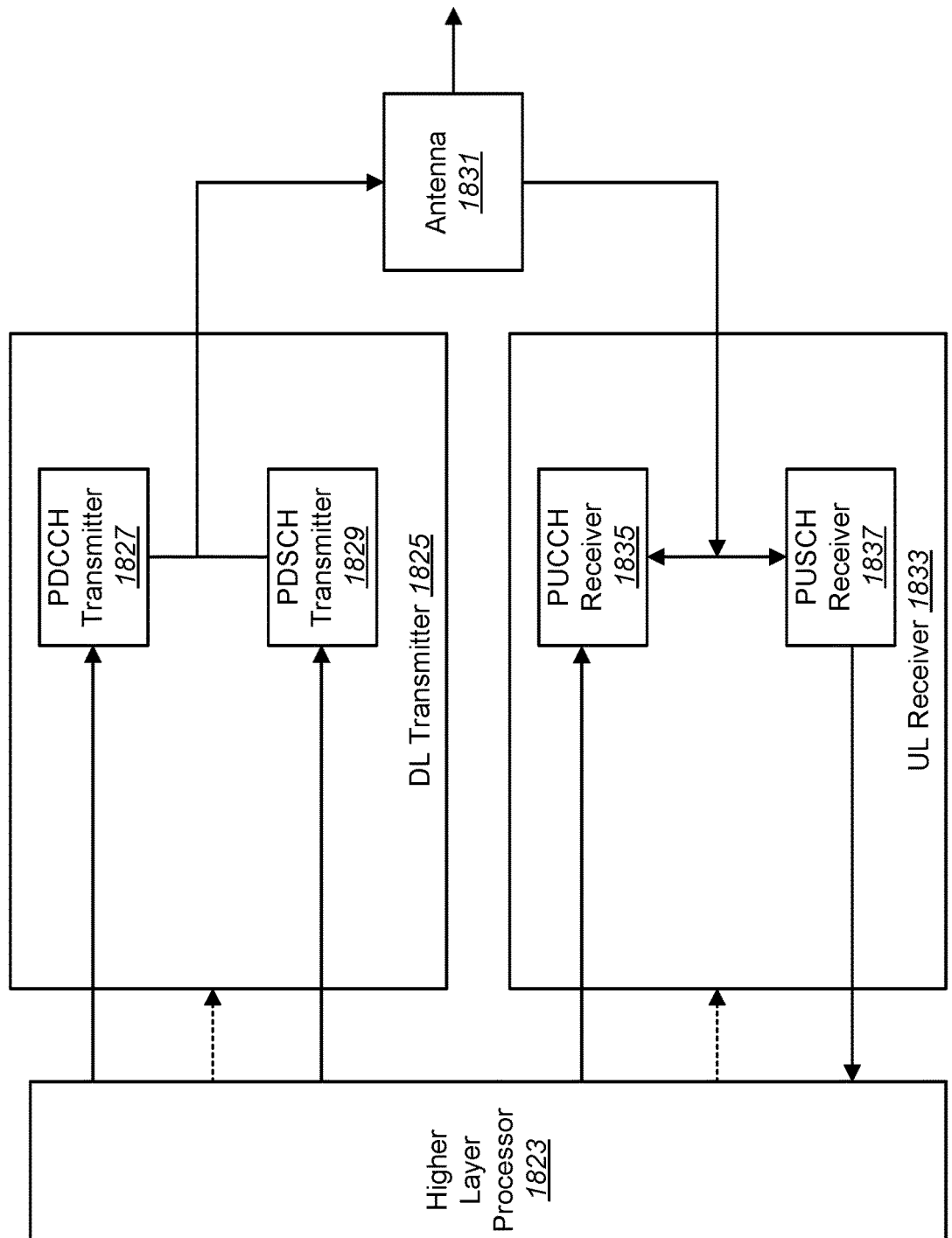
FIG. 18 is a block diagram illustrating one implementation of a gNB.

FIG. 18 is a block diagram illustrating one implementation of an gNB 1860. The gNB 1860 may include a higher layer processor 1823, a DL transmitter 1825, a UL receiver 1833, and one or more antenna 1831. The DL transmitter 1825 may include a PDCCH transmitter 1827 and a PDSCH transmitter 1829. The UL receiver 1833 may include a PUCCH receiver 1835 and a PUSCH receiver 1837.

The higher layer processor 1823 may manage physical layer's behaviors (the DL transmitter's and the UL receiver's behaviors) and provide higher layer parameters to the physical layer. The higher layer processor 1823 may obtain transport blocks from the physical layer. The higher layer processor 1823 may send/acquire higher layer messages such as an RRC message and MAC message to/from a UE's higher layer. The higher layer processor 1823 may provide the PDSCH transmitter transport blocks and provide the PDCCH transmitter transmission parameters related to the transport blocks.

The DL transmitter 1825 may multiplex downlink physical channels and downlink physical signals (including reservation signal) and transmit them via transmission antennas 1831. The UL receiver 1833 may receive multiplexed uplink physical channels and uplink physical signals via receiving antennas 1831 and de-multiplex them. The PUCCH receiver 1835 may provide the higher layer processor 1823 UCI. The PUSCH receiver 1837 may provide the higher layer processor 1823 received transport blocks.

Figure 19:
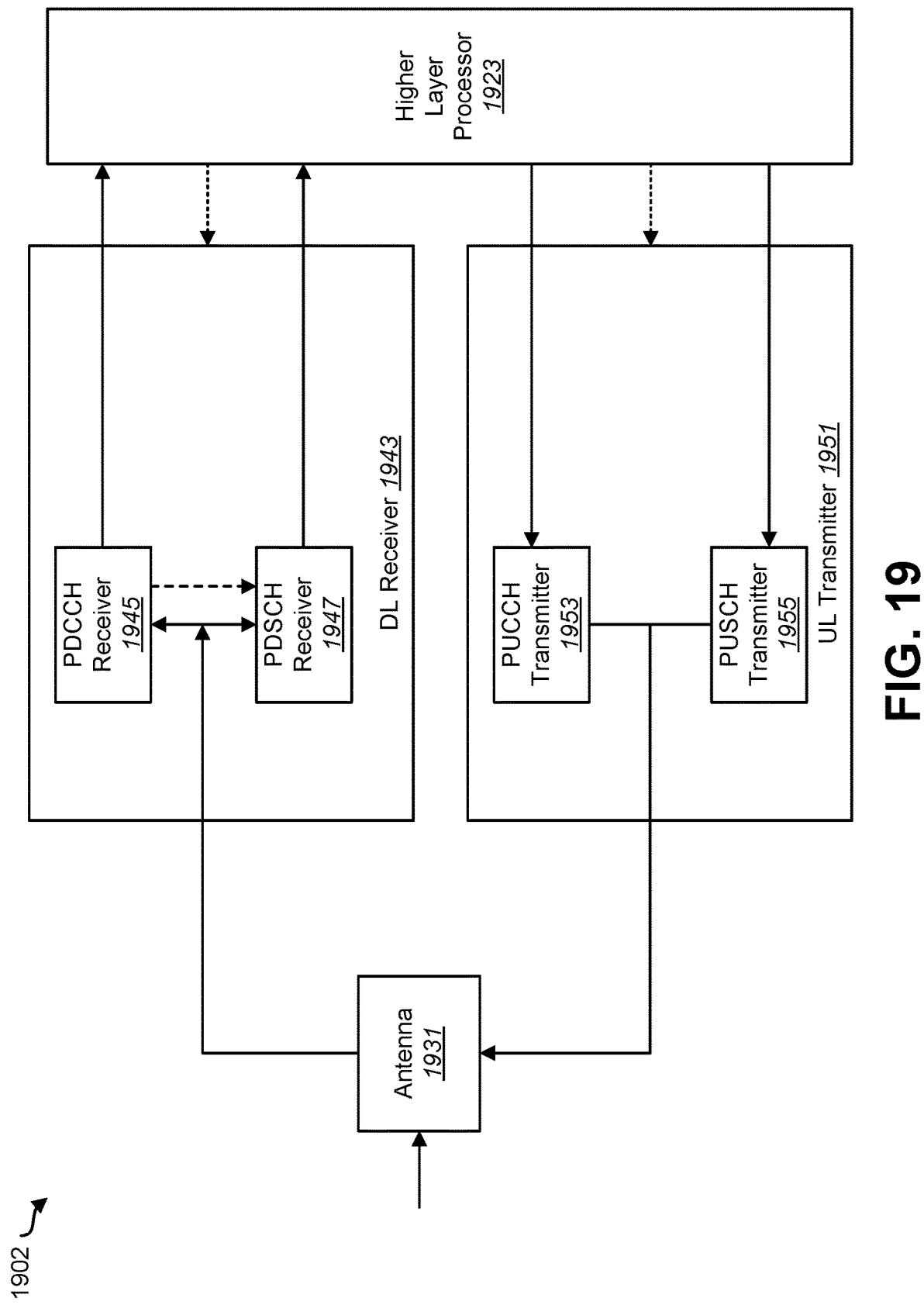
FIG. 19 is a block diagram illustrating one implementation of a UE.

FIG. 19 is a block diagram illustrating one implementation of a UE 1902. The UE 1902 may include a higher layer processor 1923, a UL transmitter 1951, a DL receiver 1943, and one or more antenna 1931. The UL transmitter 1951 may include a PUCCH transmitter 1953 and a PUSCH transmitter 1955. The DL receiver 1943 may include a PDCCH receiver 1945 and a PDSCH receiver 1947.

The higher layer processor 1923 may manage physical layer's behaviors (the UL transmitter's and the DL receiver's behaviors) and provide higher layer parameters to the physical layer. The higher layer processor 1923 may obtain transport blocks from the physical layer. The higher layer processor 1923 may send/acquire higher layer messages such as an RRC message and MAC message to/from a UE's higher layer. The higher layer processor 1923 may provide the PUSCH transmitter transport blocks and provide the PUCCH transmitter 1953 UCI.

The DL receiver 1943 may receive multiplexed downlink physical channels and downlink physical signals via receiving antennas 1931 and de-multiplex them. The PDCCH receiver 1945 may provide the higher layer processor 1923 DCI. The PDSCH receiver 1947 may provide the higher layer processor 1923 received transport blocks.

Figure 20:
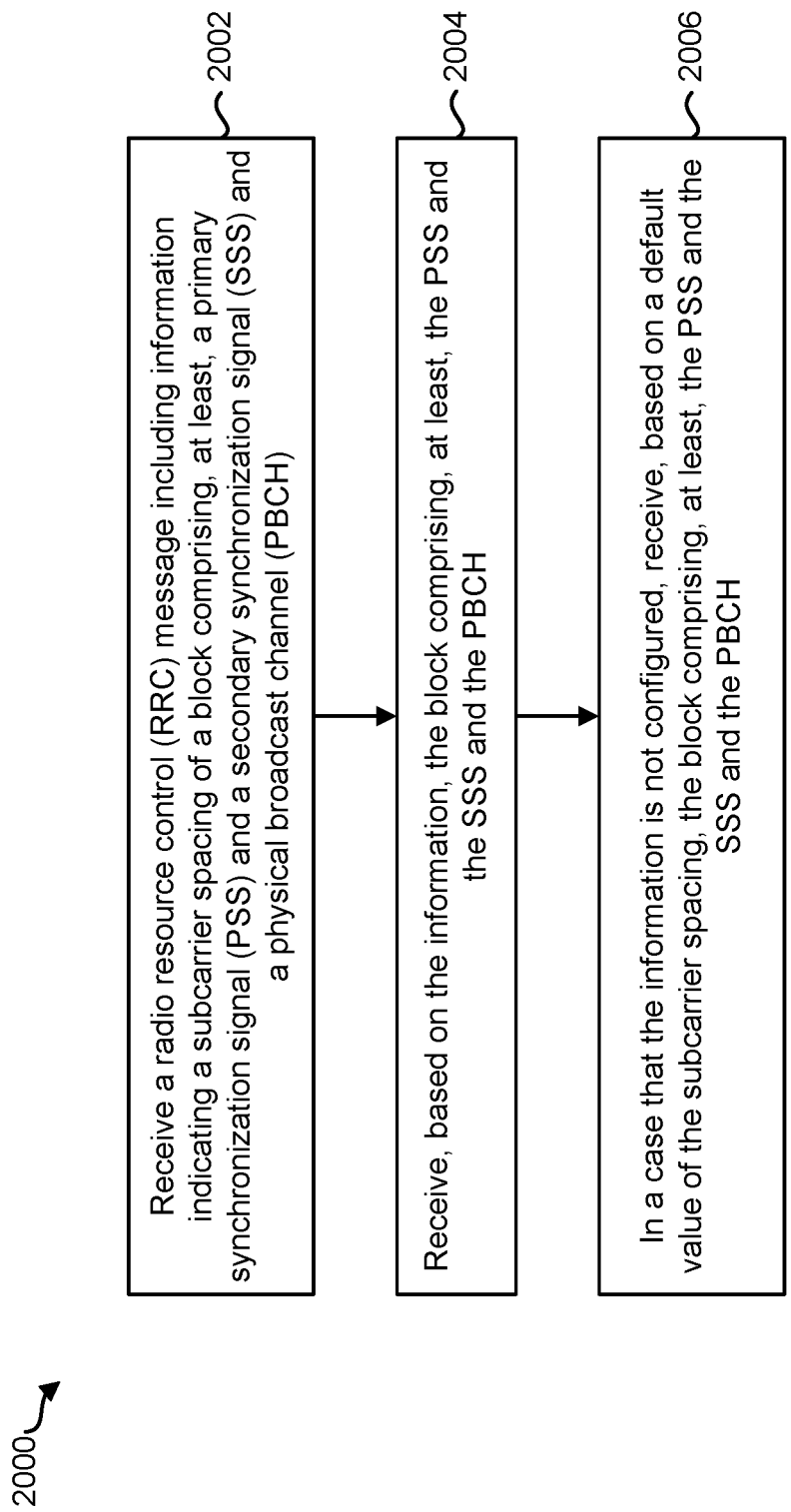
FIG. 20 is a flow diagram illustrating a method by a UE.

FIG. 20 is a flow diagram illustrating a method 2000 by a UE 102. The UE 102 may communicate with one or more gNBs 160 in a wireless communication network. In one implementation, the wireless communication network may include an LTE network and/or a 5th generation wireless communication network.

The UE 102 may receive 2002 a radio resource control (RRC) message including information indicating a subcarrier spacing of a block comprising, at least, a primary synchronization signal (PSS) and a secondary synchronization signal (SSS) and a physical broadcast channel (PBCH). The information is used only for a case where the UE is in a RRC connected. The UE 102 may receive 2004, based on the information, the block comprising, at least, the PSS and the SSS and the PBCH.

In a case that the information is not configured, the UE 102 may receive 2006, based on a default value of the subcarrier spacing, the block comprising, at least, the PSS and the SSS and the PBCH. The default value of the subcarrier spacing is given based on a frequency band.

For below 6 GHz, the default value of the subcarrier spacing may be 15 or 30 kHz. For above 6 GHz, the default value of the subcarrier spacing may be 120 or 240 kHz.

Figure 21:
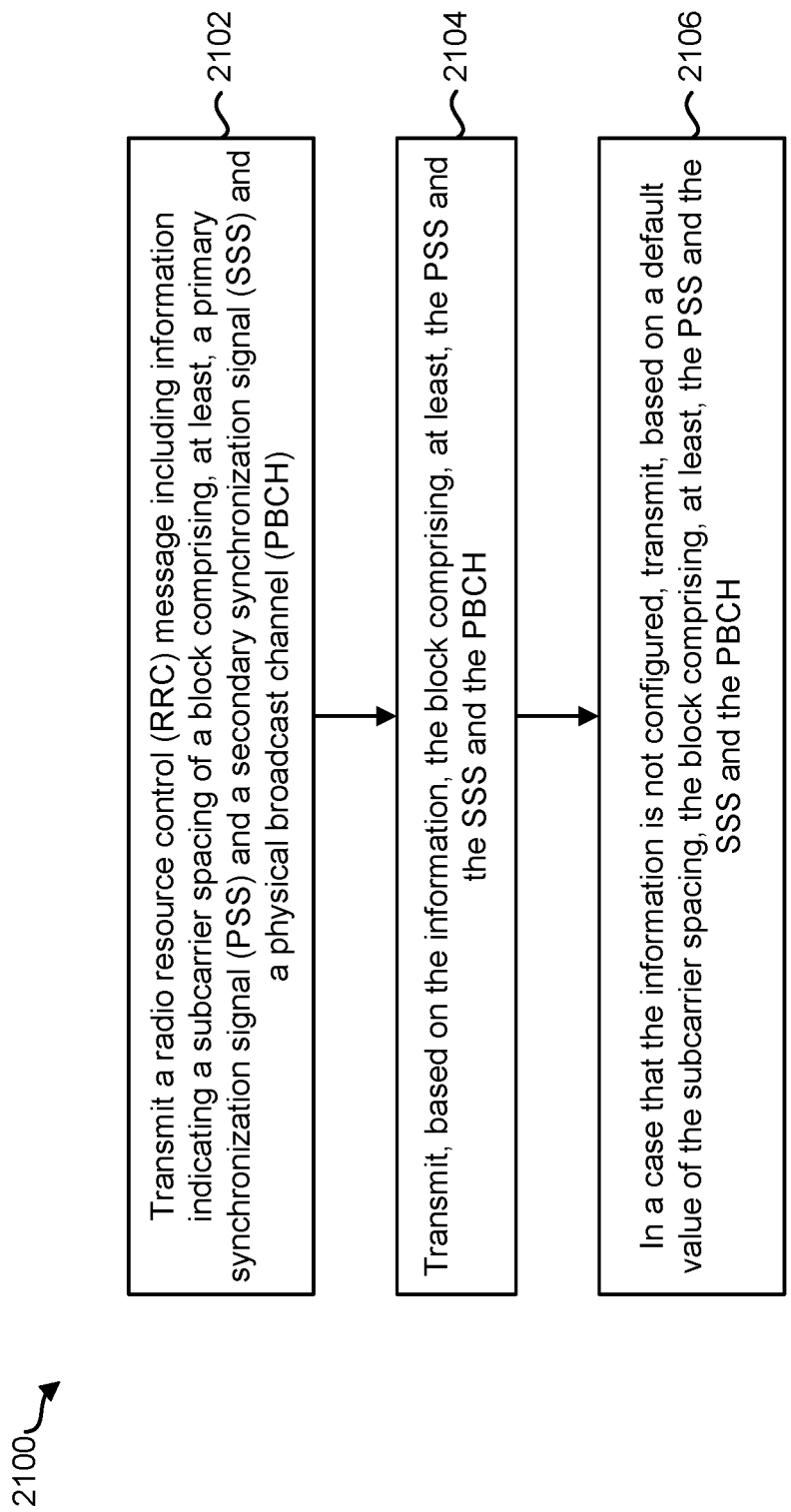
FIG. 21 is a flow diagram illustrating a method by a base station apparatus (gNB).

FIG. 21 is a flow diagram illustrating a method 2100 by a base station apparatus (gNB) 160. The gNB 160 may communicate with one or more UEs 102 in a wireless communication network. In one implementation, the wireless communication network may include an LTE network and/or a 5th generation wireless communication network.

The gNB 160 may transmit 2102 a radio resource control (RRC) message including information indicating a subcarrier spacing of a block comprising, at least, a primary synchronization signal (PSS) and a secondary synchronization signal (SSS) and a physical broadcast channel (PBCH). The information may be used only for a case where the UE is in a RRC connected. The gNB 160 may transmit 2104, based on the information, the block comprising, at least, the PSS and the SSS and the PBCH.

In a case that the information is not configured, the gNB 160 may transmit 2106, based on a default value of the subcarrier spacing, the block comprising, at least, the PSS and the SSS and the PBCH. The default value of the subcarrier spacing may be given based on a frequency band.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE) that communicates with a base station apparatus on serving cells comprising at least one or more secondary cells, comprising:
    receiving circuitry configured to receive a dedicated radio resource control (RRC) message comprising first information and second information and third information, the first information being used for configuring a subcarrier spacing of a block, the second information being used for configuring a downlink bandwidth of a secondary cell in number of physical resource blocks, the third information being used for configuring a subcarrier spacing used for a reception of a physical downlink shared channel (PDSCH), the block comprising, at least, a primary synchronization signal (PSS) and a secondary synchronization signal (SSS) and a physical broadcast channel (PBCH),
    the receiving circuitry configured to receive, based on the first information and the second information, the block on the secondary cell, wherein
    the receiving circuitry is configured to perform, based on the second information and the third information, the reception of the PDSCH on the secondary cell.

2. A base station apparatus that communicates with a user equipment (UE) on serving cells comprising at least one or more secondary cells, comprising:
    transmitting circuitry configured to transmit a dedicated radio resource control (RRC) message comprising first information and second information and third information, the first information being used for configuring a subcarrier spacing of a block, the second information being used for configuring a downlink bandwidth of a secondary cell in number of physical resource blocks, the third information being used for configuring a subcarrier spacing used for a transmission of a physical downlink shared channel (PDSCH), the block comprising, at least, a primary synchronization signal (PSS) and a secondary synchronization signal (SSS) and a physical broadcast channel (PBCH), the transmitting circuitry configured to transmit, based on the first information and the second information, the block on the secondary cell, wherein the transmitting circuitry is configured to perform, based on the second information and the third information, the transmission of the PDSCH on the secondary cell.

3. A communication method of a user equipment (UE) that communicates with a base station apparatus on serving cells comprising at least one or more secondary cells, comprising:

receiving a dedicated radio resource control (RRC) message comprising first information and second information and third information, the first information being used for configuring a subcarrier spacing of a block, the second information being used for configuring a downlink bandwidth of a secondary cell in number of physical resource blocks, the third information being used for configuring a subcarrier spacing used for a reception of a physical downlink shared channel (PDSCH), the block comprising, at least, a primary synchronization signal (PSS) and a secondary synchronization signal (SSS) and a physical broadcast channel (PBCH), receiving, based on the first information and the second information, the block on the secondary cell, and receiving, based on the second information and the third information, the PDSCH on the secondary cell.

4. A communication method of a base station apparatus that communicates with a user equipment (UE) on serving cells comprising at least one or more secondary cells, comprising:

transmitting a dedicated radio resource control (RRC) message comprising first information and second information and third information, the first information being used for configuring a subcarrier spacing of a block, the second information being used for configuring a downlink bandwidth of a secondary cell in number of physical resource blocks, the third information being used for configuring a subcarrier spacing used for a transmission of a physical downlink shared channel (PDSCH), the block comprising, at least, a primary synchronization signal (PSS) and a secondary synchronization signal (SSS) and a physical broadcast channel (PBCH), transmitting, based on the first information and the second information, the block on the secondary cell, and transmitting, based on the second information and the third information, the PDSCH on the secondary cell.

* * * * *